US012763456B2

(12) United States Patent
Kim et al.

(10) Patent No.: US 12,763,456 B2
(45) Date of Patent: Oct. 13, 2026

(54) BROADBAND ANTENNA DISPOSED IN VEHICLE

(71) Applicant: LG ELECTRONICS INC., Seoul (KR)

(72) Inventors: Changil Kim, Seoul (KR); Changwon Yun, Seoul (KR); Yeomin Youn, Seoul (KR); Kibong Jung, Seoul (KR); Yongkon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 19/112,179

(22) PCT Filed: Sep. 29, 2022

(86) PCT No.: PCT/KR2022/014685
§ 371 (c)(1),
(2) Date: Mar. 14, 2025

(87) PCT Pub. No.: WO2024/071478
PCT Pub. Date: Apr. 4, 2024

(65) Prior Publication Data

US 2026/0094962 A1 Apr. 2, 2026

(51) Int. Cl.

| | |
|---|---|
| ***H01Q 1/32*** | (2006.01) |
| ***H01Q 1/42*** | (2006.01) |
| ***H01Q 5/30*** | (2015.01) |
| ***H01Q 9/04*** | (2006.01) |

(52) U.S. Cl.
CPC ............ *H01Q 1/3275* (2013.01); *H01Q 1/42* (2013.01); *H01Q 5/30* (2015.01); *H01Q 9/0421* (2013.01)

(58) Field of Classification Search
CPC .......... H01Q 1/3275; H01Q 1/42; H01Q 5/30; H01Q 9/0421
See application file for complete search history.

(56) References Cited

U.S. PATENT DOCUMENTS

| | | | |
|---|---|---|---|
| 6,501,415 | B1 | 12/2002 | Viana et al. |
| 8,325,094 | B2 | 12/2012 | Vazquez et al. |
| 10,910,698 | B2 | 2/2021 | Wei et al. |

(Continued)

OTHER PUBLICATIONS

European Patent Office Application Serial No. 22961081.1, Search Report dated Aug. 26, 2025, 9 pages.

*Primary Examiner* — Dieu Hien T Duong
(74) *Attorney, Agent, or Firm* — LEE, HONG, DEGERMAN, KANG & WAIMEY

(57) ABSTRACT

An antenna module for a vehicle according to an embodiment may include: a first cover; a second cover formed to be able to be coupled to the first cover; and a printed circuit board (PCB) provided with multiple layers arranged inside the first cover and the second cover. The PCB provided with the multiple layers may include: a first layer provided with patterns connected to a control element; and a second layer including a feeding pattern and a conductive pattern operating as a ground. The second layer may have a slot which is formed in the edge portion thereof and from which the conductive pattern is removed. A first pattern forming a first outer peripheral area and a second pattern forming a second outer peripheral area of the slot may be divided by a slit.

20 Claims, 23 Drawing Sheets

(56) References Cited

U.S. PATENT DOCUMENTS

| | | | | |
|---|---|---|---|---|
| 2013/0087266 | A1* | 4/2013 | Becerril | B32B 38/1841 156/247 |
| 2015/0380809 | A1 | 12/2015 | Uchida | |
| 2017/0117620 | A1* | 4/2017 | Lapushin | H01Q 9/0421 |

* cited by examiner (a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

BROADBAND ANTENNA DISPOSED IN VEHICLE

CROSS-REFERENCE TO RELATED APPLICATION(S)

This application is the National Stage filing under 35 U.S.C. 371 of International Application No. PCT/KR2022/014685, filed on Sep. 29, 2022, the contents of which is hereby incorporated by reference herein in its entirety.

TECHNICAL FIELD

This specification relates to a broadband antenna disposed in a vehicle. A particular implementation relates to an antenna module having a broadband antenna to be capable of operating in various communication systems, and a vehicle having the antenna module.

BACKGROUND ART

A vehicle may perform wireless communication services with other vehicles, nearby objects, infrastructures, or a base station. In this regard, various communication services may be provided using long term evolution (LTE) communication, fifth generation (5G) communication, or WiFi communication technology.

In order to provide these various wireless communication services in a vehicle, an antenna may be arranged on a glass of the vehicle, on or below a roof of the vehicle. When the antenna is arranged on or below the roof of the vehicle, an effect on a vehicle body and the roof of the vehicle may cause a change in antenna performance.

In this regard, there is a problem in that a vehicle body and a vehicle roof are made of a metallic material to block radio waves. Accordingly, a separate antenna structure may be arranged on top of the vehicle body or the vehicle roof. Alternatively, when the antenna structure is arranged below the vehicle body or roof, a portion of the vehicle body or roof corresponding to an antenna arrangement region may be made of a non-metallic material.

There is a need to provide wireless communication services in areas outside and inside a vehicle through vehicle antennas. In relation to this, when a vehicle antenna is arranged within the roof of the vehicle, there is a problem that it is difficult to provide a wireless signal to the area inside the vehicle.

Various antenna elements need to be arranged in an antenna module for the vehicle to provide various communication services other than fourth generation (4G)/5G communication services in vehicles. When the antenna module for the vehicle is arranged on a roof structure of the vehicle, a wireless signal for the 4G/5G communication services is radiated outside the vehicle. When a Wi-Fi antenna is arranged on the antenna module for the vehicle, a Wi-Fi radio signal needs to be transmitted into the vehicle. Therefore, an antenna structure that transmits a Wi-Fi wireless signal into a vehicle in a structure in which an antenna module is placed on a vehicle roof structure made of a metallic material is described.

To provide a Wi-Fi communication service, a Wi-Fi antenna needs to operate in a plurality of frequency bands, for example, in a 5.4 GHz band and a 6.4 GHz band as well as in a 2.4 GHz band. Additionally, to perform broadband operation in the 2.4 GHz band, a Wi-Fi antenna needs to operate in dual-band resonance.

DISCLOSURE OF INVENTION

Technical Problem

The present disclosure is directed to solving those problems and other drawbacks. Additionally, the present disclosure is also directed to radiate a wireless signal into a vehicle through an antenna module arranged on a roof structure of the vehicle to be located outside the vehicle.

Another aspect of the present disclosure is to transmit a Wi-Fi wireless signal into a vehicle through a Wi-Fi antenna of an antenna module arranged on a roof structure of the vehicle.

Another aspect of the present disclosure is to provide an antenna element that resonates in multiple bands in Wi-Fi frequency bands in an antenna module for a vehicle.

Another aspect of the present disclosure is to provide an antenna structure that performs a multi-mode operation by defining different current paths according to Wi-Fi frequency bands in an antenna module for a vehicle.

Another aspect of the present disclosure is to provide a configuration capable of maintaining isolation while optimizing antenna performances for multi-input/multi-output (MIMO) and WiFi.

Another aspect of the present disclosure is to improve antenna performance of an antenna module while maintaining a height of the antenna module at a predetermined level or less.

Another aspect of the present disclosure is to provide a structure for mounting, on a vehicle, an antenna module capable of operating in a broad band to support various communication systems.

Solution to Problem

To achieve the above or other purposes, an antenna module of a vehicle according to an embodiment may include a first cover; a second cover configured to be capable of being combined with the first cover; and a printed circuit board (PCB) having multiple layers (multi-layers) arranged inside the first cover and the second cover. The PCB having the multiple layers may include: a first layer having patterns connected to a control element; and a second layer including a conductive pattern that operates as ground and a feeding pattern. The second layer may have a slot which is arranged in an edge portion thereof and from which the conductive pattern is removed. A first pattern constituting a first outer peripheral area and a second pattern constituting a second outer peripheral area each included in the slot may be divided by a slit.

According to an embodiment, a pattern that operates as ground, among the patterns of the first layer, may be connected to the conductive pattern of the second layer through a via, and the feeding pattern is connected to the first pattern through a connection pattern. An inner surface of the second cover may have a conductive pattern placed thereon, and the conductive pattern of the second cover may be electrically connected to the first pattern. The second cover may have a non-conductive portion, and the non-conductive portion may be configured to overlap the slot of the PCB.

According to an embodiment, the antenna module may further include an added conductive pattern connected to a first point in the first outer peripheral area inwardly adjacent to a point connected to the connection pattern through a dielectric contact portion, and arranged to be bent toward inside of the first outer peripheral area.

According to an embodiment, the first pattern of the first outer peripheral area may include a first sub-pattern connected to the connection pattern and, a second sub-pattern connected to the first sub-pattern and constituting an end portion of the PCB. The slot may include a first slot area arranged between the first sub-pattern and the second outer peripheral area, and a second slot area arranged between the second sub-pattern and the second outer peripheral area According to an embodiment, a second length of the second sub-pattern may be configured to be greater than a first length of the first sub-pattern. A second slot length of the second slot area is configured to be smaller than a first slot length of the first slot area. The added conductive pattern may be arranged within an area defined by the first slot area and radiate a signal through the non-conductive portion of the second cover.

According to an embodiment, the added conductive pattern may be arranged on one surface of the non-conductive portion of the second cover. The added conductive pattern may transmit a signal into the vehicle through the non-conductive portion of the second cover.

According to an embodiment, the added conductive pattern may include: a first sub-conductive pattern connected to the first pattern of the first outer peripheral area and arranged to extend in a first axial direction; and a second sub-conductive pattern arranged to extend from an end portion of the first sub-conductive pattern in a second axial direction perpendicular to the first axial direction. The second sub-conductive pattern may extend from the second slot area toward the second sub-pattern so that an end portion of the second sub-conductive pattern is arranged to be apart from an end portion of the second sub-pattern by a predetermined space.

According to an embodiment, an antenna element that radiates a signal in a plurality of frequency bands through the first pattern of the first outer peripheral area, the second pattern of the second outer peripheral area, and the slot may be arranged. The antenna element may transmit a signal of the plurality of frequency bands into the vehicle through the non-conductive portion of the second cover.

According to an embodiment, a first electric field may be coupled from the first outer peripheral area to the second outer peripheral area in a first frequency band. The antenna element may operate in a first mode, which is a closed slot mode, in the first frequency band by the coupled first electric field.

According to an embodiment, a second electric field may be generated through the first outer peripheral area and the second outer peripheral area each included in the slot in a second frequency band. The antenna element may operate in a second mode, which is an open slot mode, in the second frequency band which is higher than the first frequency band by the second electric field.

According to an embodiment, a third electric field is generated through an area in which the connection pattern is arranged, the first outer peripheral area, and the second outer peripheral area in a third frequency band. The antenna element may operate in a planar inverted-F antenna (PIFA) mode toward an end portion of the added conductive pattern. The antenna element may operate in a third mode in which the open slot mode and the PIFA mode are combined with each other in the third frequency band which is higher than the second frequency band by the third electric field.

According to an embodiment, a fourth electric field may be generated through an area in which the connection pattern is arranged and the first outer peripheral area in a fourth frequency band. The antenna element may operate in a planar inverted-F antenna (PIFA) mode toward the end portion of the added conductive pattern. The antenna element may operate in a fourth mode in which the open slot mode and the PIFA mode are combined with each other in the fourth frequency band which is higher than the third frequency band by the fourth electric field.

According to an embodiment, the PCB may further include at least one third layer arranged between the first layer and the second layer. The slot area may further include a third slot area arranged to be adjacent to an inner end portion of the first pattern of the first outer peripheral area, and having the feeding pattern arranged therein. The third slot area may include at least one conductive pad adjacent to the feeding pattern. According to an embodiment, the slit may include a first slit area which is arranged on the third layer and from which a dielectric area is removed. The first slit area may be arranged between the first sub-pattern and the at least one conductive pad.

According to an embodiment, the slot area may further include a fourth slot area arranged to be adjacent to an inner end portion of the second pattern of the second outer peripheral area. The fourth slot area may include at least one second conductive pad arranged between the second pattern and the third pattern each included in the second outer peripheral area, the third pattern being configured to connect the first pattern and the second pattern. The slit may further include a second slit area which is arranged in the third layer and from which a dielectric area is removed. The second slit area may be arranged between the second pattern and the at least one second conductive pad.

According to an embodiment, the antenna module may further include a plurality of antenna elements arranged on the first layer and configured to radiate a signal in a particular frequency band through a non-conductive portion of the first cover. The plurality of antenna elements may radiate signals in the particular frequency band to outside of the vehicle through the non-conductive portion of the first cover to perform multiple input/multiple output (MIMO) with an entity outside the vehicle.

A vehicle according to another aspect of this specification may include: a roof structure configured as an outer appearance of the vehicle and including a first fixing part and a second fixing part; and an antenna module arranged on the roof structure. The antenna module may include: a second cover configured to be capable of being combined with the first cover; and a printed circuit board (PCB) having multiple layers (multi-layers) arranged inside the first cover and the second cover. The PCB having the multiple layers may include: a first layer having patterns connectible to a control element or a radiator; and a second layer including a conductive pattern that operates as ground and a feeding pattern, the second layer having a slot which is arranged in an edge portion thereof and from which the conductive pattern is removed.

According to an embodiment, a first pattern constituting the first outer peripheral area and a second pattern constituting the second outer peripheral area each included in the slot may be divided by a slot area which is a dielectric area from which a conductive pattern is remove. A pattern that operates as ground, among the patterns of the first layer, may be connected to the conductive pattern of the second layer through a via, and the feeding pattern may be connected to the first pattern through a connection pattern. An inner surface of the second cover may have a conductive pattern placed thereon, and the conductive pattern of the second cover may be electrically connected to the first pattern. The second cover may have a non-conductive portion, and the non-conductive portion may be configured to overlap the slot of the PCB to radiate signals in a plurality of frequency bands.

According to an embodiment, the antenna module may further include an added conductive pattern connected to a first point in the first outer peripheral area inwardly adjacent to a point connected to the connection pattern through a dielectric contact portion, and arranged to be bent toward inside of the first outer peripheral area.

According to an embodiment, the first pattern of the first outer peripheral area may include a first sub-pattern connected to the connection pattern, and a second sub-pattern connected to the first sub-pattern and constituting an end portion of the PCB. The slot area may include: a first slot area arranged between the first sub-pattern and the second outer peripheral area; a second slot area arranged between the second sub-pattern and the second outer peripheral area; and a third slot area in which the feeding pad is arranged.

According to an embodiment, a second length of the second sub-pattern is configured to be greater than a first length of the first sub-pattern. A second slot length of the second slot area may be configured to be smaller than a first slot length of the first slot area. The added conductive pattern may be arranged within an area defined by the first slot area, and the added conductive pattern may radiate signals in the plurality of frequency bands through the non-conductive portion of the second cover.

According to an embodiment, an antenna element that radiates a signal in a plurality of frequency bands through the first pattern of the first outer peripheral area, the second pattern of the second outer peripheral area, and the slot may be arranged. The antenna element may transmit a signal of the plurality of frequency bands into the vehicle through the non-conductive portion of the second cover.

According to an embodiment, a first electric field may be coupled from the first outer peripheral area to the second outer peripheral area in a first frequency band. A second electric field may be generated through the first outer peripheral area and the second outer peripheral area each included in the slot in a second frequency band which is higher than the first frequency band. The antenna element may operate in a first mode, which is a closed slot mode, in the first frequency band by the coupled first electric field. The antenna element may operate in a second mode, which is an open slot mode, in the second frequency band by the second electric field.

According to an embodiment, a third electric field may be generated through an area in which the connection pattern is arranged, the first outer peripheral area, and the second outer peripheral area in a third frequency band. A fourth electric field may be generated through an area in which the connection pattern is arranged and the first outer peripheral area in a fourth frequency band which is higher than the third frequency band. The connection pattern may be connected to the first pattern and operates in a planar inverted-F Antenna (PIFA) mode in the area in which the connection pattern is arranged. The antenna element may operate in a third mode in which the open slot mode and the PIFA mode are combined with each other in the third frequency band which is higher than the second frequency band by the third electric field. The antenna element may operate in a fourth mode in which the open slot mode and the PIFA mode are combined with each other in the fourth frequency band by the fourth electric field.

Advantageous Effects of Invention

Hereinafter, technical effects of an antenna module having such a broadband antenna element mounted on a vehicle and the vehicle having the antenna module mounted thereon are described.

According to this specification, an antenna module arranged on a roof structure of a vehicle to be located outside the vehicle may radiate a wireless signal into the vehicle through a non-conductive portion of a lower cover.

According to this specification, an antenna module arranged on a roof structure of a vehicle may transmit a Wi-Fi wireless signal into the vehicle through an antenna element having a slot structure and a non-conductive portion of a lower cover.

According to this specification, an antenna element that resonates in multiple bands in Wi-Fi frequency bands through conductive patterns and an added conductive pattern arranged in a slot area in an antenna module for a vehicle may be provided.

According to this specification, an antenna structure that operates in multiple modes may be provided by defining different current paths according to Wi-Fi frequency bands through conductive patterns and an added conductive pattern arranged in a slot area in an antenna module of a vehicle.

According to this specification, by arranging a fourth-generation (4G)/fifth-generation (5G) antenna and a Wi-Fi antenna for multiple input/multiple output (MIMO) on front and rear surfaces of a printed circuit board (PCB), respectively, a configuration capable of maintaining isolation while optimizing performance of both the 4G/5G antenna and the Wi-Fi antenna may be provided.

According to this specification, by arranging a 4G/5G antenna and a Wi-Fi antenna on front and rear surfaces of a PCB, respectively, antenna performance may be improved, while a height of an antenna module is maintained below a certain level.

According to this specification, by arranging a 4G/5G antenna and a Wi-Fi antenna for multiple input/multiple output (MIMO) on front and rear surfaces of a PCB, respectively, an antenna module capable of operating in a broad band may be mounted on a vehicle to support various communication systems.

Further scope of applicability of the disclosure will become apparent from the foregoing detailed description. It should be understood, however, that the detailed description and specific examples, such as the preferred embodiment of the disclosure, are given by way of illustration only, since various modifications and alternations within the spirit and scope of the disclosure will be apparent to those skilled in the art.

MODE FOR THE INVENTION

Figure 1A:
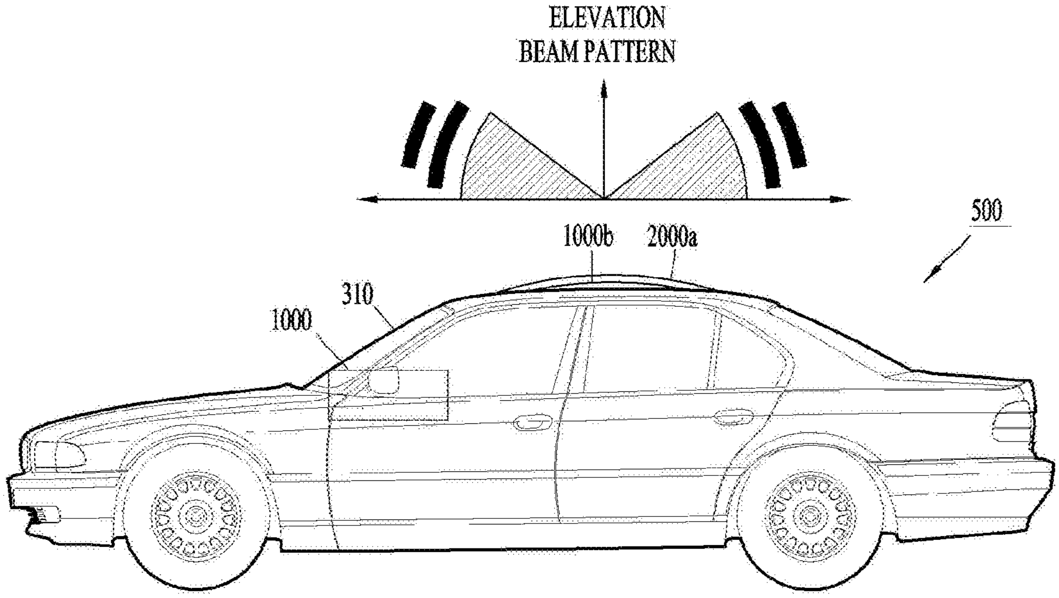
FIGS. 1A to 1C are views of a structure for mounting an antenna module in a vehicle, which includes an antenna system mounted in the vehicle, according to the present disclosure.

A description will now be given in detail according to embodiments disclosed herein, with reference to the accompanying drawings. For the sake of a brief description with reference to the drawings, the same or equivalent components may be provided with the same reference numbers, and the description thereof will not be repeated. Suffixes "module" and "unit" used for components used in the following description are merely intended for easy description of the specification, and each suffix itself is not intended to give any special meaning or function. In describing the embodiments disclosed herein, moreover, the detailed description will be omitted when a specific description for publicly known technologies to which the disclosure pertains is judged to obscure the gist of the disclosure. The accompanying drawings are used to help easily understand various technical features, and it should be understood that the embodiments presented herein are not limited by the accompanying drawings. As such, the disclosure should be construed to extend to any alterations, equivalents, and substitutes in addition to those which are particularly set forth in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the another element or intervening elements may also be present. In contrast, when an element is referred to as being "directly connected with" another element, there are no intervening elements present.

The singular forms are intended to include the plural forms as well, unless the context clearly indicates otherwise.

The term "include" or "has" as used herein should be understood that it is intended to indicate the existence of a feature, a number, a step, an element, a component, or a combination thereof disclosed in the specification, and it may also be understood that the existence or additional possibility of one or more other features, numbers, steps, elements, components, or combinations thereof are not excluded in advance.

An antenna system described herein may be mounted in a vehicle. Configurations and operations according to embodiments may also be applied to a communication system, namely, an antenna system mounted in a vehicle. In this regard, the antenna system mounted in the vehicle may include a plurality of antennas, and a transceiver circuit and a processor both configured to control the plurality of antennas.

A description will now be given in detail according to embodiments disclosed herein, with reference to the accompanying drawings. For the sake of a brief description with reference to the drawings, the same or equivalent components may be provided with the same reference numbers, and the description thereof will not be repeated. Suffixes "module" and "unit" used for components used in the following description are merely intended for easy description of the specification, and each suffix itself is not intended to give any special meaning or function. In describing the embodiments disclosed herein, moreover, the detailed description will be omitted when a specific description for publicly known technologies to which the disclosure pertains is judged to obscure the gist of the disclosure. The accompanying drawings are used to help easily understand various technical features, and it should be understood that the embodiments presented herein are not limited by the accompanying drawings. As such, the disclosure should be construed to extend to any alterations, equivalents, and substitutes in addition to those which are particularly set forth in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the another element or intervening elements may also be present. In contrast, when an element is referred to as being "directly connected with" another element, there are no intervening elements present.

The singular forms are intended to include the plural forms as well, unless the context clearly indicates otherwise.

The term "include" or "has" as used herein should be understood that it is intended to indicate the existence of a feature, a number, a step, an element, a component, or a combination thereof disclosed in the specification, and it may also be understood that the existence or additional possibility of one or more other features, numbers, steps, elements, components, or combinations thereof are not excluded in advance.

An antenna system (antenna module) described herein may be mounted in a vehicle. Configurations and operations according to embodiments may be applied to a communication system, namely, an antenna system mounted in a vehicle. In this regard, the antenna system mounted in the vehicle may include a plurality of antennas, and a transceiver circuit and a processor both configured to control the plurality of antennas.

Hereinafter, an antenna module mounted in a vehicle according to this specification will be described. In this regard, FIGS. 1A to 1C are views of a structure for mounting an antenna module in a vehicle, which includes an antenna system mounted in the vehicle, according to the present disclosure.

The antenna system for the vehicle that includes the antenna module may be combined with other antennas. Referring to FIGS. 1A to 1C, in addition to the antenna system 1000 implemented as an internal antenna module, a separate antenna system 1000*b* may be further configured. FIGS. 1A and 1B illustrate a structure in which the antenna system 1000*b*, in addition to the antenna system 1000, is mounted on or in a roof of the vehicle. On the other hand, FIG. 3C illustrates a structure in which the separate antenna system 1000*b*, in addition to the antenna system 1000, is mounted in a roof of the vehicle or a roof frame of a rear mirror of the vehicle.

Figure 1B:
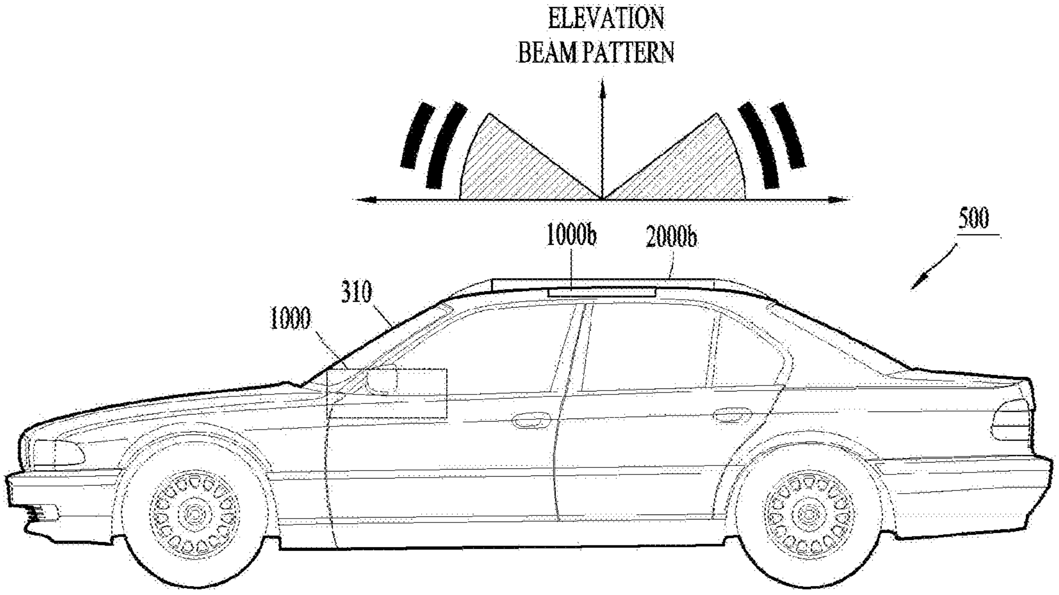
Figure 1C:
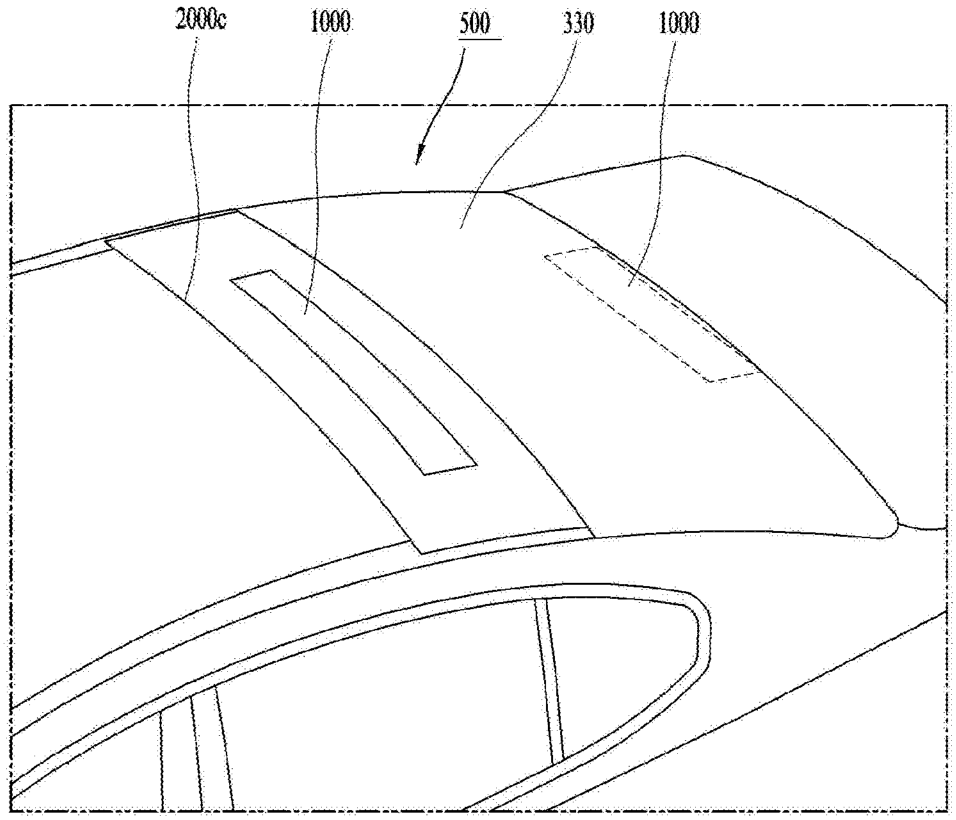

Referring to FIGS. 1A to 1C, to improve the appearance of the vehicle and to maintain a telematics performance at the time of collision, an existing shark fin antenna may be replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 1A, an antenna system 1000 may be mounted inside the vehicle, but is not limited thereto. A second antenna system 1000*b* corresponding to an external antenna may be arranged on the roof of the vehicle. In FIG. 1A, a radome 2000*a* may cover the second antenna system 1000*b* to protect the second antenna system 1000*b* from an external environment and external impacts while the vehicle travels. The radome 2000*a* may be made of a dielectric material through which radio signals are transmitted/received between the second antenna system 1000*b* and a base station.

Referring to FIG. 1B, the antenna system 1000 may be implemented inside the vehicle. Meanwhile, the second antenna system 1000*b* corresponding to the external antenna may be placed within a roof structure of the vehicle and at least part of the roof structure may be made of a non-metallic material. In this instance, at least a part of a roof structure 2000*b* of the vehicle may be implemented using a non-metallic material, and thus, made of a dielectric material through which radio signals transmitted/received between the antenna system 1000*b* and the base station may penetrate.

Referring to FIG. 1C, the antenna system 1000 may be implemented on a rear window 330 of the vehicle and inside the vehicle. The second antenna system 1000*b* corresponding to the external antenna may be placed within a roof frame of the vehicle, and at least part of a roof frame 2000*c* may be made of a non-metallic material. At this time, the roof frame 2000*c* of the vehicle 500 except for the at least part made of the non-metallic material may be made of a dielectric material through which radio signals are transmitted/received between the second antenna system 1000*b* and the base station.

Referring to FIGS. 1 to 1, antennas provided in the antenna system 1000 mounted in the vehicle may form a beam pattern in a direction perpendicular to a front window 310 or the rear window 330. Antennas provided in the second antenna system 1000 mounted in the vehicle may further define a beam coverage by a certain angle in a horizontal region with respect to the vehicle body.

Meanwhile, the vehicle 500 may include only the antenna unit (i.e., the internal antenna system) 1000 corresponding to the internal antenna without the antenna system 1000*b* corresponding to the external antenna.

Figure 2:
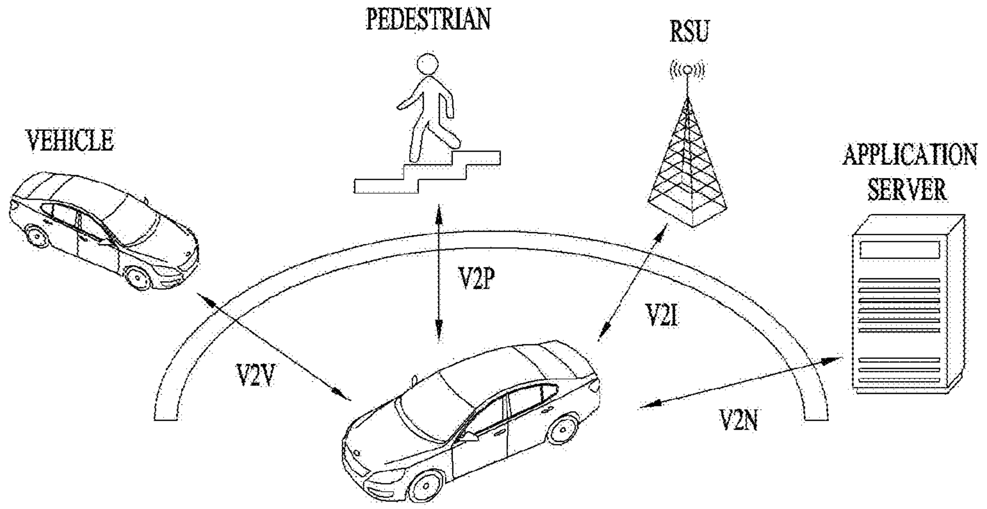
FIG. 2 illustrates types of vehicle-to-everything (V2X) applications.

The vehicle 500 may be configured to communicate with pedestrians, adjacent infrastructures, and/or servers in addition to adjacent vehicles. In this regard, FIG. 2 illustrates types of V2X applications. Referring to FIG. 2, vehicle-to-everything (V2X) communication may include communication between a vehicle and each of all entities, such as vehicle-to-vehicle (V2V) communication which refers to communication between vehicles, vehicle-to-infrastructure (V2I) communication which refers to communication between a vehicle and an eNB or a road side unit (RSU), vehicle-to-pedestrian (V2P) communication which refers to communication between a vehicle and a terminal carried by a person (a pedestrian, a cyclist, a vehicle driver, or a passenger), vehicle-to-network (V2N) communication, and the like.

In order to support the V2X communication, the vehicle may perform wireless communication with eNB and/or gNB through an antenna system. In this regard, the antenna module may be implemented as an external antenna module and/or an internal antenna module as illustrated in FIGS. 1A to 1C.

Figure 3:
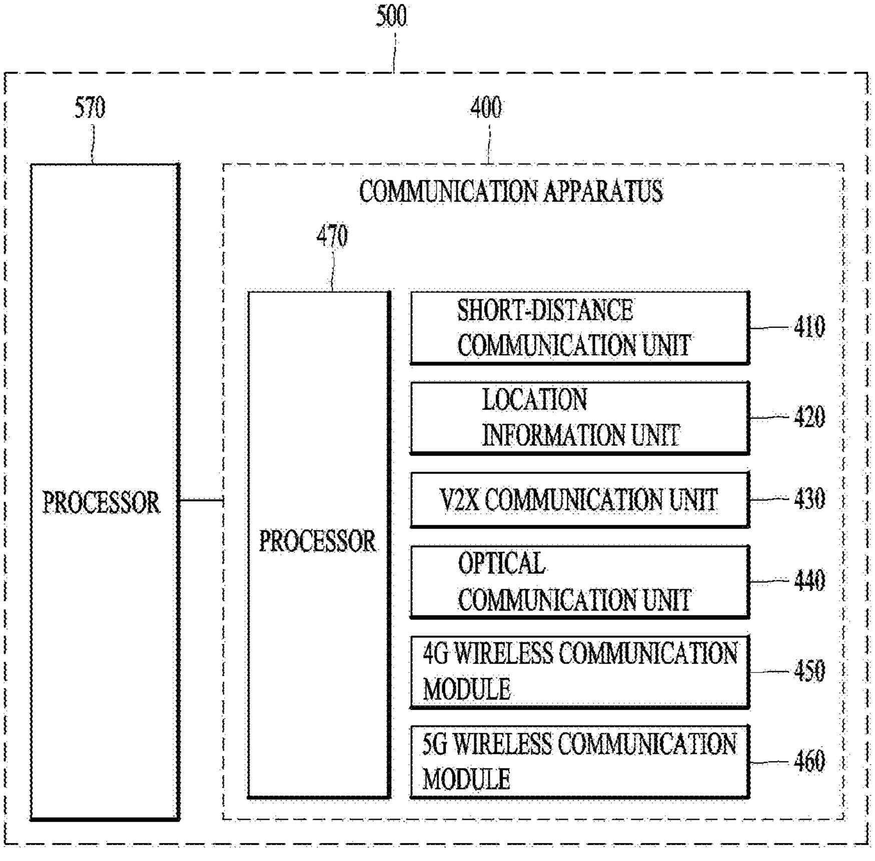
FIG. 3 is a block diagram referenced for explaining a vehicle and an antenna system mounted in the vehicle according to an embodiment of the disclosure.

Meanwhile, FIG. 3 is a block diagram referenced for explaining a vehicle and an antenna system mounted in the vehicle according to an embodiment of the disclosure.

The vehicle 500 may be configured to include a communication device 400 and a processor 570. The communication device 400 may correspond to a telematics control unit (TCU) of the vehicle 500.

The communication device 400 may be a device for performing communication with an external device. Here, the external device may be another vehicle, a mobile terminal, or a server. The communication device 400 may perform the communication by including at least one of a transmitting antenna, a receiving antenna, a radio frequency (RF) circuit, and an RF device for implementing various communication protocols. In this regard, the communication device 400 may include a short-range communication unit 410, a location information unit 420, a V2X communication unit 430, an optical communication unit 440, a 4G wireless communication module 450, and a 5G wireless communication module 460. The communication device 400 may include a processor 470. According to an embodiment, the communication device 400 may further include other components in addition to the components described, or may not include some of the components described.

The 4G wireless communication module 450 and the 5G wireless communication module 460 may perform wireless communications with one or more communication systems through one or more antenna modules. The 4G wireless communication module 450 may transmit and/or receive signals to and/or from a device in a first communication system through a first antenna module. Also, the 5G wireless communication module 460 may transmit and/or receive signals to and/or from a device in a second communication system through a second antenna module. The 4G wireless communication module 450 and 5G wireless communication module 460 may also be physically implemented as one integrated communication module. For example, the first communication system and the second communication system may be an LTE communication system and a 5G communication system, respectively. However, the first communication system and the second communication system may not be limited thereto, and may expand to any different communication systems.

The processor of the device within the vehicle 500 may be implemented as a micro control unit (MCU) or a modem. The processor 470 of the communication device 400 may correspond to a modem, and the processor 470 may be implemented as an integrated modem. The processor 470 may acquire surrounding information from other adjacent vehicles, objects, or infrastructures through wireless communication. The processor 470 may perform vehicle control using the acquired surrounding information.

The processor 570 of the vehicle 500 may be a processor of a car area network (CAN) or advanced driving assistance system (ADAS), but is not limited thereto. When the vehicle 500 is implemented in a distributed control manner, the processor 570 of the vehicle 500 may be replaced with a processor of each device.

Meanwhile, the antenna module arranged in the vehicle 500 may be configured to include a wireless communication unit. The 4G wireless communication module 450 may perform transmission and reception of 4G signals with a 4G base station through a 4G mobile communication network. In this instance, the 4G wireless communication module 450 may transmit at least one 4G transmission signal to the 4G base station. In addition, the 4G wireless communication module 450 may receive at least one 4G reception signal from the 4G base station. In this regard, uplink (UL) multi-input/multi-output (MIMO) may be performed based on a plurality of 4G transmission signals transmitted to the 4G base station. In addition, downlink (DL) MIMO may be performed based on a plurality of 4G reception signals received from the 4G base station.

The 5G wireless communication module 460 may perform transmission and reception of 5G signals with a 5G base station through a 5G wireless communication network. Here, the 4G base station and the 5G base station may have a non-stand-alone (NSA) architecture. The 4G base station and the 5G base station may be arranged, for example, in the non-stand-alone (NSA) architecture. Alternatively, the 5G base station may be arranged in a stand-alone (SA) architecture at a separate location from the 4G base station. The 5G wireless communication module 460 may perform transmission and reception of 5G signals with a 5G base station through a 5G wireless communication network. In this instance, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a band of 6 GHz or less, may be used as the 5G frequency band. In contrast, a millimeter-wave (mmWave) band may be used as the 5G frequency band to perform broadband high-speed communication. When the mm Wave band is used, the electronic device may perform beamforming for coverage expansion of an area where communication with a base station is possible.

Meanwhile, regardless of the 5G frequency band, in the 5G communication system, MIMO may be supported to be performed a plurality of times, to improve a transmission rate. In this instance, UL MIMO may be performed by a plurality of 5G transmission signals that are transmitted to a 5G base station. DL MIMO may be performed by a plurality of 5G reception signals that are received from the 5G base station.

Meanwhile, a state of dual connectivity (DC) with both the 4G base station and the 5G base station may be attained through the 4G wireless communication module 450 and the 5G wireless communication module 460. As such, the dual connectivity with the 4G base station and the 5G base station may be referred to as EUTRAN NR DC (EN-DC). In some examples, when the 4G base station and the 5G base station are arranged in a co-located structure, throughput improvement may be achieved by inter-carrier aggregation (inter-CA). Accordingly, when the 4G base station and the 5G base station are arranged in the EN-DC state, the 4G reception signal and the 5G reception signal may be simultaneously received through the 4G wireless communication module 450 and the 5G wireless communication module 460. Short-range communication between electronic devices (e.g., vehicles) may be performed between electronic devices (e.g., vehicles) using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, carrier aggregation (CA) may be carried out using at least one of the 4G wireless communication module 450 and the 5G wireless communication module 460, and a WiFi communication module 113. In this regard, 4G+WiFi carrier aggregation (CA) may be performed using the 4G wireless communication module 450 and the WiFi communication module 113. Or, 5G+WiFi CA may be performed using the 5G wireless communication module 460 and the WiFi communication module.

Meanwhile, the communication device 400 may implement a display device for a vehicle together with a user interface device. In this instance, the display device for the vehicle may be referred to as a telematics apparatus or an audio video navigation (AVN) apparatus.

Meanwhile, referring to FIGS. 1A to 3, the antenna module mounted to the vehicle may be arranged inside the vehicle, on the roof of the vehicle, inside the roof, or inside the roof frame. In this regard, the antenna system disclosed herein may be configured to operate in a low band (LB), mid band (MB), and high band (HB) of a 4G LTE system and a SUB6 band of a 5G NR system. The antenna system disclosed in this specification may be configured to operate in a plurality of frequency bands for Wi-Fi communication services.

Hereinafter, a broadband antenna structure for a vehicle according to the present specification will be described. In this regard, FIG. 4 illustrates a structure in which an antenna module according to this specification is mounted on a vehicle, and one side view and another side view of the antenna module.

Figure 4:
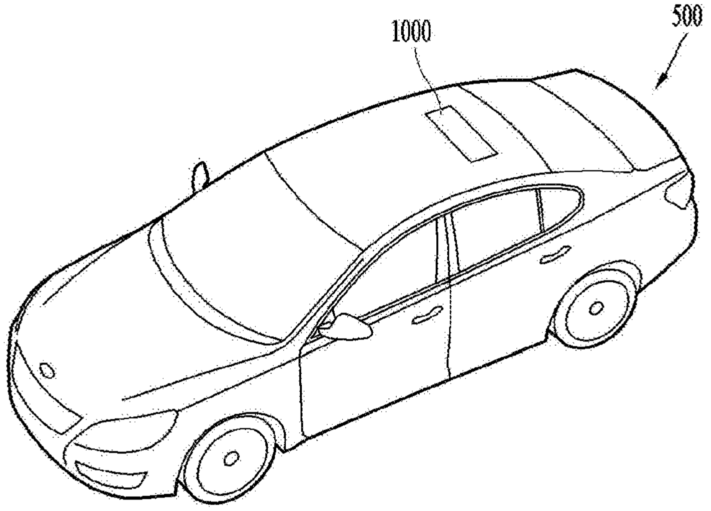
FIG. 4 illustrates a structure in which an antenna module according to this specification is mounted on a vehicle, and one side view and another side view of the antenna module.
Figure 4:
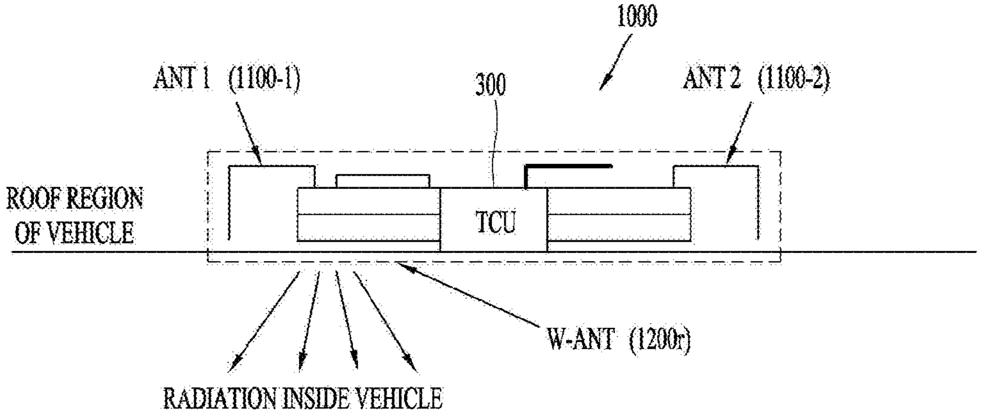
Figure 4:
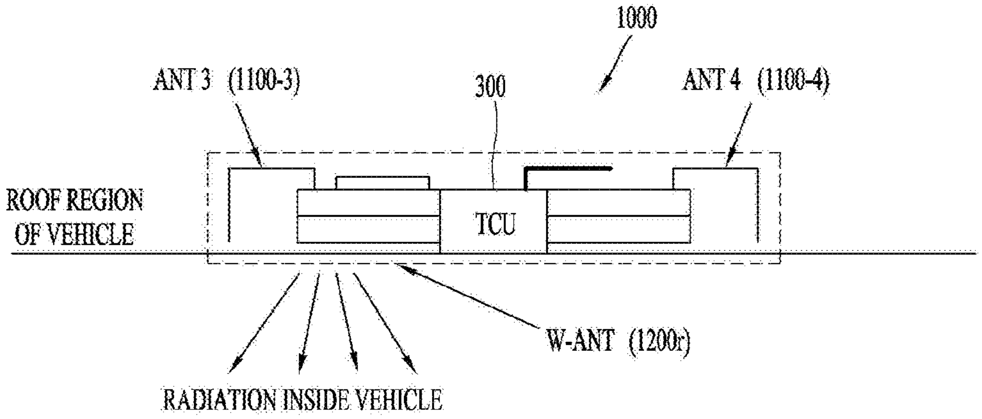

Referring to FIGS. 1A to 3 and (a) of FIG. 4, an antenna module 1000 may be mounted on the vehicle 500. The antenna module 1000 may be arranged on or inside the roof structure 2000*a*, 2000*b*, or 2000*c* of the vehicle. At least a part of the roof structure 2000*a*, 2000*b*, or 2000*c* may be implemented in a form of a radome made of a dielectric material to allow to transmit radio signals.

(b) of FIG. 4 illustrates one side view of the antenna module 1000 as viewed from one side, and (c) of FIG. 4 illustrates another side view of the antenna module 1000 as viewed from another side. Referring to (b) of FIG. 4 and (c) of FIG. 4, a plurality of antenna elements 1100-1 to 1100-4 configured to radiate wireless signals in a 4G/5G frequency band may be arranged. The plurality of antenna elements 1100-1 to 1100-4 may be arranged at different locations on a front surface of a PCB corresponding to a multi-layer substrate.

The first antenna 1100-1 and the second antenna 1100-2 may be arranged to be apart from each other in one axial direction. The third antenna 1100-3 and the fourth antenna 1100-4 may be arranged to be apart from each other in one axial direction. The first antenna 1100-1 and the second antenna 1100-3 may be arranged to be apart from each other in another axial direction perpendicular to one axis. The second antenna 1100-2 and the fourth antenna 1100-4 may be arranged to be apart from each other in the another axial direction. A telematics control unit (TCU) 300 may be configured to control a signal transmitted to the first antenna 1100-1 to the fourth antenna 1100-4. Multiple input/multiple output (MIMO) operation may be performed by simultaneously transmitting or receiving signals in a same frequency band through two or more antennas among the first antenna 1100-1 to the fourth antenna 1100-4.

Meanwhile, a Wi-Fi antenna 1200*r* may be placed on a rear surface of the PCB for Wi-Fi wireless communication inside the vehicle. A wireless signal in a Wi-Fi frequency band may be radiated into the vehicle through the Wi-Fi antenna 1200*r*. Hereinafter, a vehicle Wi-Fi antenna structure operable in a broadband frequency band according to this specification is described in detail.

Figure 5A:
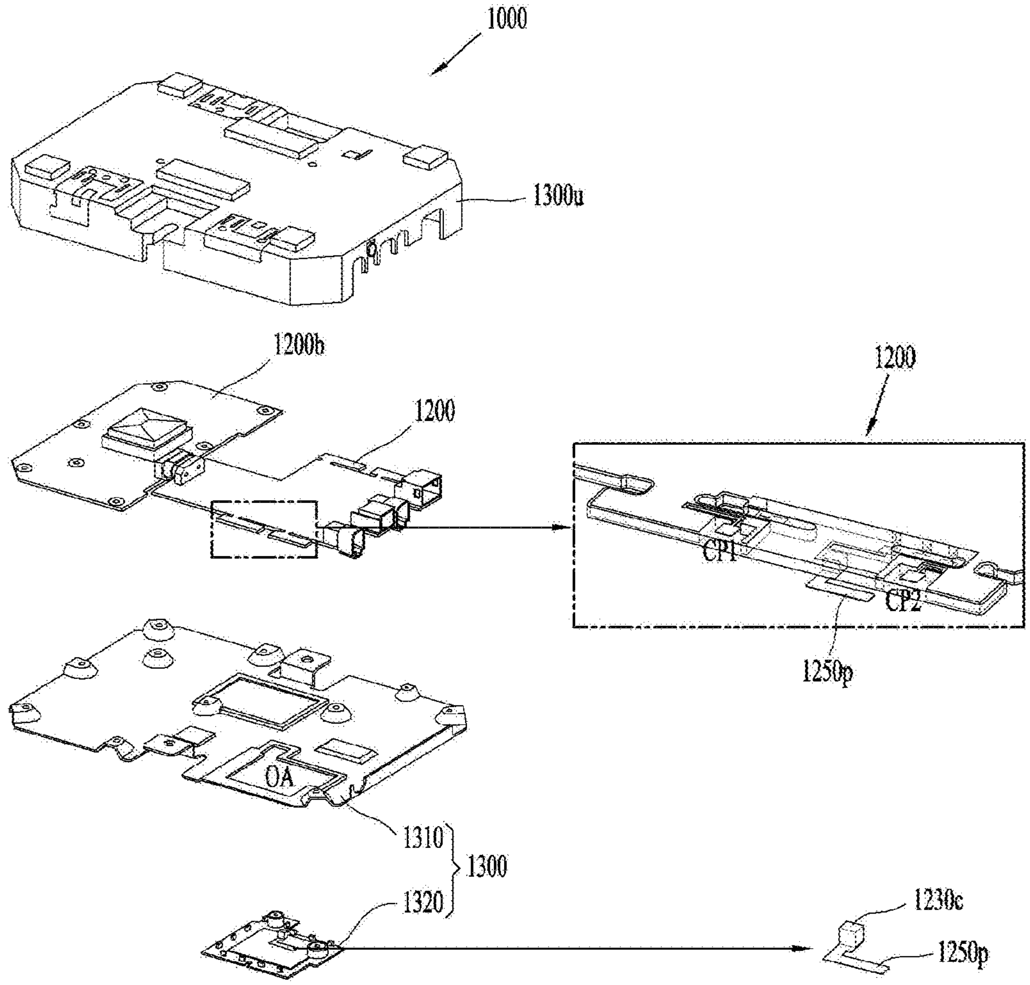
FIG. 5A is an exploded view of respective component portions of the antenna module according to this specification.
Figure 5B:
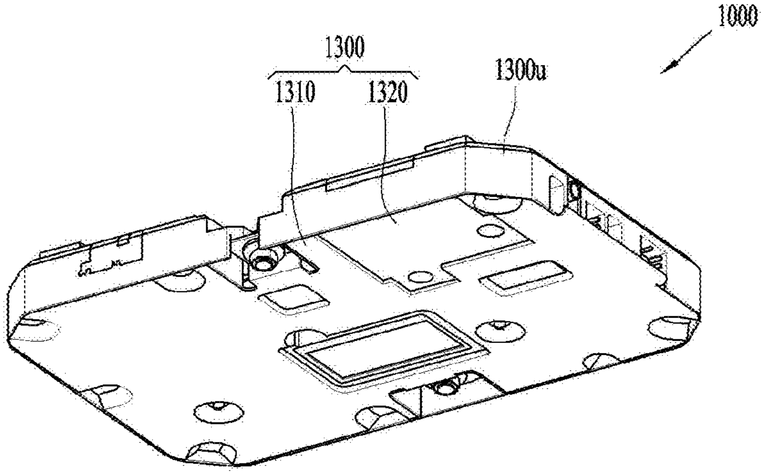
FIG. 5B is a rear view of the antenna module of FIG. 5A.

As described above, a vehicle Wi-Fi antenna structure operable in a broadband frequency band according to this specification is described in detail. In this regard, FIG. 5A illustrates an exploded view of respective component portions of an antenna module according to this specification. FIG. 5B illustrates a rear view of the antenna module of FIG. 5A. Referring to FIGS. 5A and 5B, the antenna module 1000 may include a first cover 1300*u*, a second cover 1300, and a PCB 1200 having a multi-layer substrate structure. The first cover 1300*u* and the second cover 1300 may constitute an upper cover and a lower cover, respectively, and the PCB 1200 may be placed between the first cover 1300*u* and the second cover 1300. The PCB 1200 may be referred to as an antenna PCB or an antenna substrate since antenna elements are arranged thereon. The PCB 1200 may be combined with a separate second PCB 1200*b* on which control elements are arranged.

The first cover 1300*u* and the second cover 1300 may be combined with each other as shown in FIG. 5B, and mounted on a roof structure of a vehicle. Interface terminals may be placed on one side surface portion of the first cover 1300*u* to allow the vehicle and the antenna module 1000 to transmit or receive control signals to/from the vehicle through the interface terminals.

The second cover 1300, which is the lower cover, may be configured to include a conductive portion 1310 made of a metallic material and a non-conductive portion 1320 made of a dielectric material. An added conductive pattern (additional conductive pattern) 1250*p* separate from the conductive pattern of the PCB 1200 may be implemented as a radiator in the non-conductive portion 1320. On a front surface of the PCB 1200, a ground pattern may be placed, and conductive pads CP1 and CP2 separate from the ground pattern may be placed. The added conductive pattern 1250*p* connected to a rear surface of the PCB 1200 may constitute a Wi-Fi antenna structure together with the rear surface of the PCB 1200, conductive patterns, and slot patterns. Hereinafter, a Wi-Fi antenna structure that radiates wireless signals into a vehicle according to this specification is described.

Figure 6A:
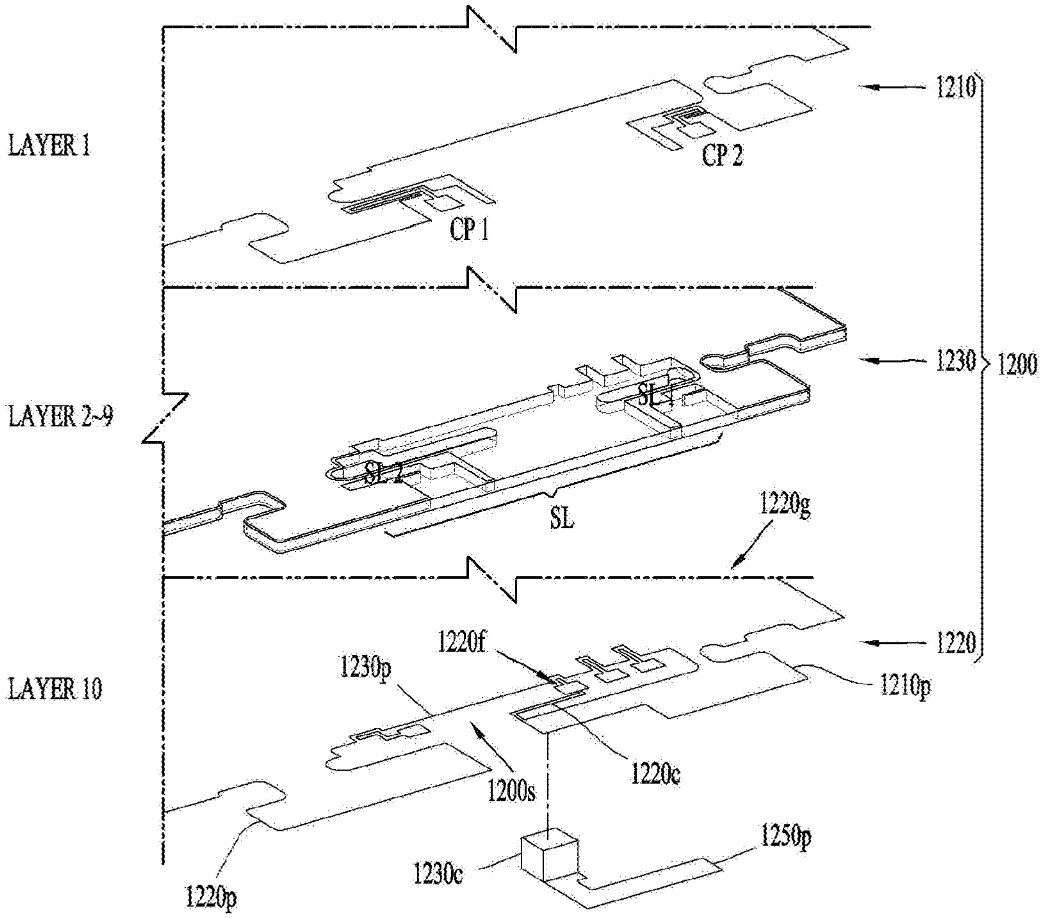
FIGS. 6A and 6B illustrate a structure in which respective layers of a PCB of FIG. 5A are connected to an added conductive pattern.
Figure 6B:
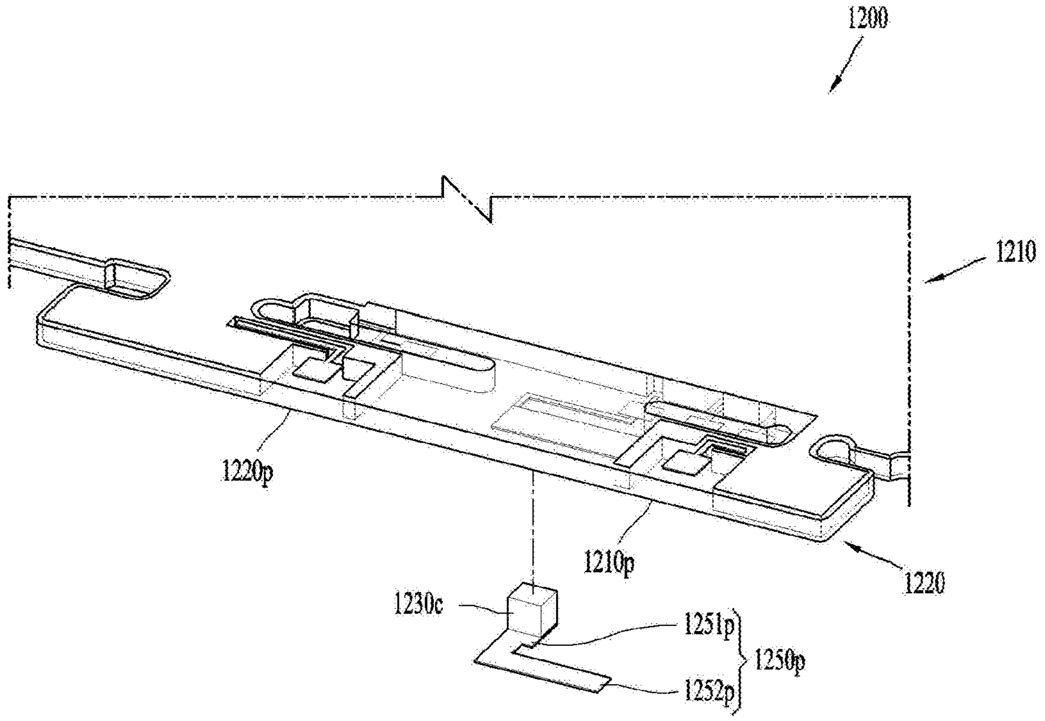

As described above, a Wi-Fi antenna structure that radiates wireless signals into a vehicle is described. In this regard, FIGS. 6A and 6B illustrate a structure in which respective layers of the PCB of FIG. 5A are connected to an added conductive pattern. FIG. 6A illustrates a structure in which a PCB corresponding to a multi-layer substrate is divided according to each layer, and FIG. 6B is a perspective view illustrating a front surface and a rear surface of the PCB of FIG. 6A.

Referring to FIGS. 5A to 6A, the PCB 1200 may be implemented as a structure in which multiple layers (multi-layers) are stacked. A conductive pattern may be arranged on a first layer 1210 which is an upper layer. The first conductive pad CP1 and the second conductive pad CP2 may be arranged on the first layer 1210 separately from the conductive pattern of the first layer 1210. A conductive pattern may be arranged as a ground pattern 1220*g* on the second layer 1220 which is a lower layer. Separately from the ground pattern 1220*g*, a feeding pattern 1220*f*, a connection pattern 1220*c*, and a slot 1200*s* may constitute a Wi-Fi antenna structure. The slot 1200*s* may be arranged between a first pattern 1210*p* and a second pattern 1220*p* of the conductive pattern.

A third layer 1230 which is an intermediate layer may be arranged between the first layer 1210 and the second layer 1220. The third layer 1230 of the PCB 1200 may be configured as multiple layers. The Wi-Fi antenna structure may be configured to operate in a broader band due to the added conductive pattern 1250*p* connected to the first pattern 1210*p* separately from the slot 1200*s*.

Referring to FIGS. 5A to 6B, the PCB 1200 may be configured as a multi-layer dielectric substrate structure. Conductive patterns of the first layer 1210 and the second layer 1220 may be arranged on a front surface and a rear surface of the PCB 1200 having a multi-layer dielectric substrate structure. The added conductive pattern 1250*p* may be configured as a plurality of sub-patterns. The added conductive pattern 1250*p* may be configured to include a first sub-conductive pattern 1251*p* in one axial direction and a second sub-conductive pattern 1252*p* in another axial direction. The added conductive pattern 1250*p* may be connected to the conductive pattern of the second layer 1220 through a contact portion 1230*c*. The contact portion 1230*c* may be made of a metallic material or a dielectric material. When the contact portion 1230*c* is made of the metallic material, the added conductive pattern 1250*p* is configured as an antenna structure having a direct coupling structure with respect to the conductive pattern of the second layer 1220. When the contact portion 1230*c* is made of the dielectric material, the added conductive pattern 1250*p* is configured as an antenna structure having an indirect coupling structure with respect to the conductive pattern of the second layer 1220.

Figure 7A:
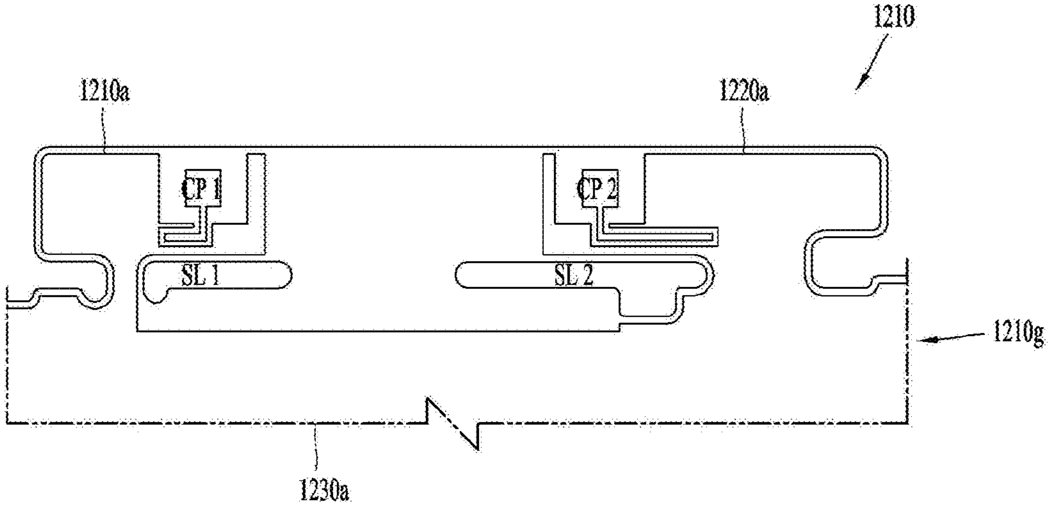
FIGS. 7A and 7B are a front view and a rear view of the PCB of FIG. 5A, respectively.
Figure 7B:
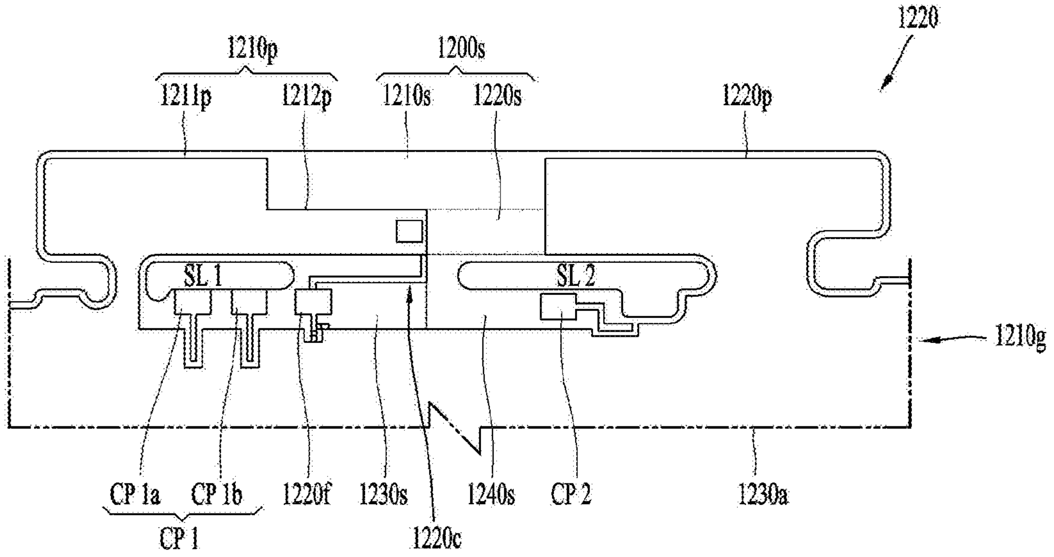
Figure 7B:
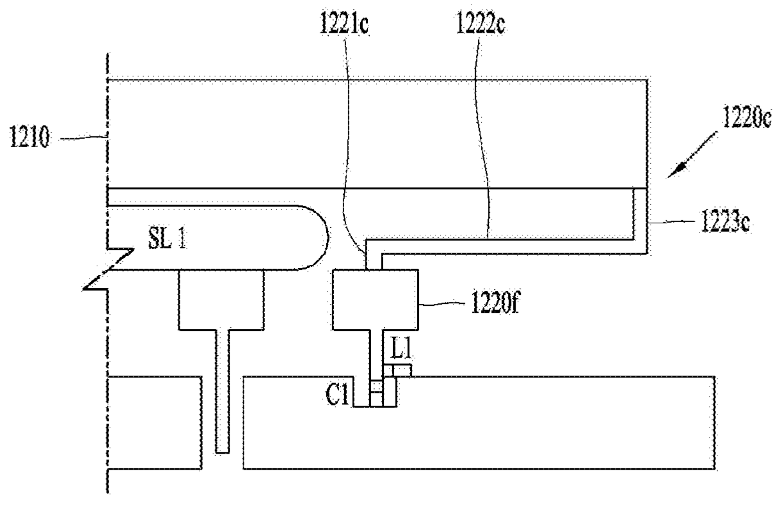
Figure 7C:
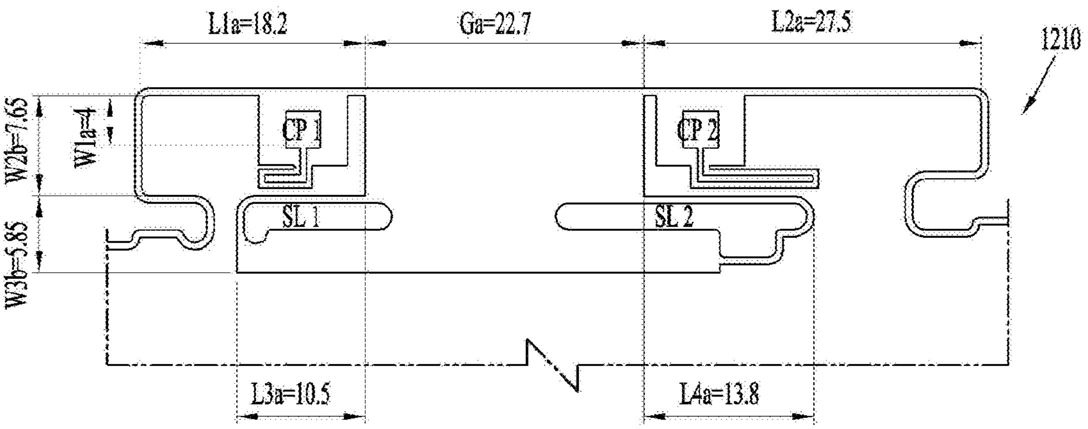
FIG. 7C shows dimensions of respective parts of conductive patterns arranged on front and rear surfaces of the PCB of FIG. 5A.
Figure 7C:
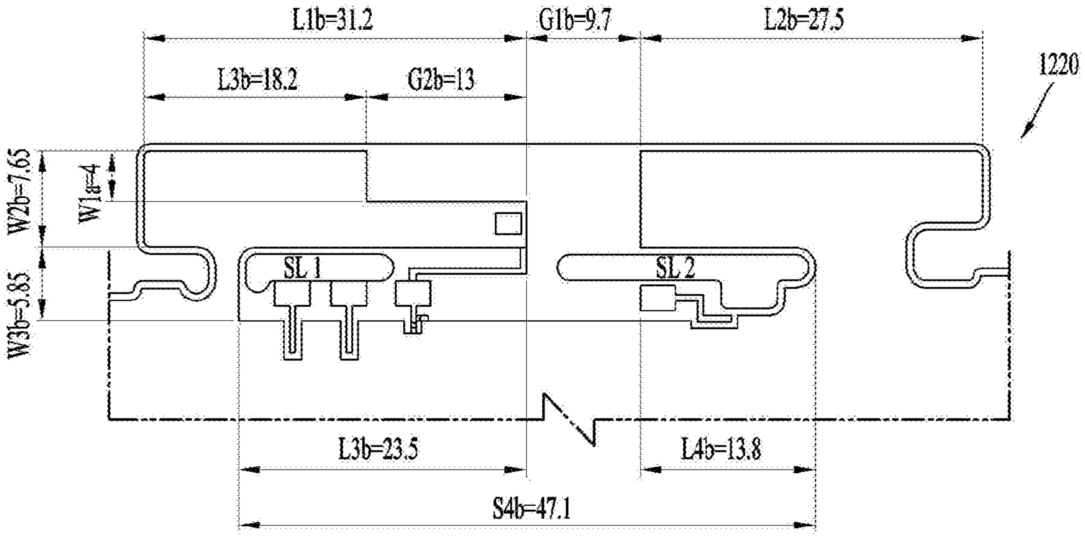

Hereinafter, a detailed structure of conductive patterns arranged on front and rear surfaces of a PCB on which a Wi-Fi antenna structure according to this specification is placed is described. In this regard, FIGS. 7A and 7B illustrate a front view and a rear view of the PCB of FIG. 5A, respectively. FIG. 7C shows dimensions of respective parts of conductive patterns arranged on front and rear surfaces of the PCB of FIG. 5A.

Referring to FIG. 7A, the first layer 1210 corresponding to the front surface of the PCB may include a first pattern 1210*a* and a second pattern 1220*a* arranged on one side region and another side region, respectively. A dielectric area in which a conductive pattern is not arranged may be located between the first pattern 1210*a* and the second pattern 1220*a*. Slits SL1 and SL2 in which the dielectric area is removed may be arranged in areas below the first pattern 1210*a* and the second pattern 1220*a*, respectively. The first layer 1210 may further include a third pattern 1230*a* configured to connect the first pattern 1210*a* to the second pattern 1220*a*. A conductive pattern including the first pattern 1210*a* to the third pattern 1230*a* may constitute a ground pattern 1210*g*. The first and second conductive pads CP1 and CP2 may be configured as a structure separate from the ground pattern 1210*g*. The first and second conductive pads CP1 and CP2 may be electrically connected to a control element or an antenna element.

Referring to (a) of FIG. 7B, the second layer 1220 corresponding to the rear surface of the PCB may have shapes of the conductive patterns optimally implemented to define the Wi-Fi antenna structure. The second layer 1220 may include the first pattern 1210*p* and the second pattern 1220*p* arranged on one side region and another side region, respectively. A dielectric area in which a conductive pattern is not arranged may be located between the first pattern 1210*p* and the second pattern 1220*p*. The slits SL1 and SL2 in which the dielectric area is removed may be arranged in areas below the first pattern 1210*p* and the second pattern 1220*p*, respectively. The second layer 1220 may further include a third pattern 1230*p* configured to connect the first pattern 1210*p* to the second pattern 1220*p*. A conductive pattern including the first pattern 1210*p* to the third pattern 1230*p* may constitute the ground pattern 1220*g*. The first and second conductive pads CP1 and CP2 may be configured as a structure separate from the ground pattern 1220*g*. The first and second conductive pads CP1 and CP2 may be electrically connected to a control element or an antenna element.

(b) of FIG. 7B is an enlarged view of the feeding pattern 1220*f* of the second layer 1220 of the PCB of (a) of FIG. 7B, and a peripheral area thereof. Referring to (b) of FIG. 7B, the feeding pattern 1220*f* may be connected to the first pattern 1210 through the connection pattern 1220*c*. The connection pattern 1220*c* may be implemented as a plurality of conductive patterns 1221*c* to 1223*c* to constitute a feeding structure within a limited area.

Referring to FIG. 7A to (a) of FIG. 7C, the first pattern 1210*a* and the second pattern 1220*a* of the first layer 1210 constituting the front surface of the PCB may be configured to have a first length L1*a* and a second length L2*a*, respectively. The first pattern 1210*a* and the second pattern 1220*a* may be apart from each other by a predetermined space Ga to constitute a dielectric area in which a conductive pattern is not placed.

The first pattern 1210*a* may be configured to have a first width W1*a* from an upper end of the first pattern 1210*a* to a lower end of the first conductive pad CP1. The first pattern 1210*a* may be configured to have a second width W2*a* from an upper end of the first pattern 1210*a* to a lower end of the first pattern 1210*a* adjacent to the slit SL1. The first pattern 1210*a* and the third pattern 1230*a* may be configured to have a third width W3*a* from a lower end of the first pattern 1210*a* adjacent to the slit SL1 to an upper end of the third pattern 1230*a*. One end side portion of the first pattern 1210*a* and one side end portion of the third pattern 1230*a* may be apart from each other by a third length L3*a*. One side end portion of the second pattern 1220*a* and another side end portion of the third pattern 1230*a* may be apart from each other by a third length L4*a*.

Referring to FIG. 7A to (b) of FIG. 7C, the first pattern 1210*p* and the second pattern 1220*p* of the second layer 1220 constituting a rear surface of the PCB may be configured to have a first length L1*b* and a second length L2*b*. A second sub-pattern 1212*p* of the first pattern 1210*p* and the second pattern 1220*p* may be apart from each other by a first space G1*b* to define a dielectric area in which a conductive pattern is not placed. An end portion of a first sub-pattern 1211*p* of the first pattern 1210*p* and an end portion of the second sub-pattern 1212*p* may be apart from each other by a second space G2*b*.

The first sub-pattern 1211*p* and the second sub-pattern 1212*p* may be configured to have the first width W1*a* and the second width W2*a*, respectively. The first sub-pattern 1211*p* may be configured to have a third length L3*b*, and the second sub-pattern 1212*p* may be configured to have the first length L1*b*. A width from one side of the second sub-pattern 1212*p* adjacent to the slit SL1 to an upper end of the third pattern 1230*a* may be defined as a third width W3*a*. One side end portion of the first pattern 1210*p* and one side end portion of the third pattern 1230*p* may be apart from each other by the third length L3*b*. One side end portion of the second pattern 1220*p* and another side end portion of the third pattern 1230*p* may be apart from each other by a third length L4*b*.

In this regard, an end portion of the second pattern 1220*p* of the second layer on which a Wi-Fi antenna is not arranged may be placed to correspond to an end portion of the second pattern 1220*a* of the first layer. The second pattern 1220*p* of the second layer may be configured to have a same length and a same width as the second pattern 1220*a* of the first layer. The first pattern 1210*p* of the second layer on which the Wi-Fi antenna is arranged may be configured to have a greater length than that of the first pattern 1210*a* of the first layer. The first pattern 1210*p* of the second layer on which the Wi-Fi antenna is arranged may be configured to have a same width as that of the first pattern 1210*a* of the first layer.

Hereinafter, referring to FIGS. 1 to 7C, a vehicle equipped with an antenna module according to this specification will be described. The antenna module 1000 of the vehicle may be configured to include the first cover 1300*u*, the second cover 1300, and the printed circuit board (PCB) 1200. The first cover 1300*u* and the second cover 1300 may correspond to an upper cover and a lower cover, respectively. The second cover 1300 may be configured to be combined with the first cover 1300*u*.

The PCB 1200 may be placed in an inner region between the first cover 1300*u* and the second cover 1300. The PCB 1200 may have multiple layers (multi-layers). For example, the PCB 1200 having the multiple layers may include the first layer 1210 and the second layer 1220. The first layer 1210 and the second layer 1220 may be an upper layer and a lower layer of the PCB 1200, respectively. Referring to FIG. 6A, the PCB 1200 may further include the third layer 1230 positioned between the first layer 1210 and the second layer 1220. When the PCB 1200 corresponding to a multi-layer substrate includes N layers, the first layer 1210 and the second layer 1220 may be Layer 1 and Layer N, respectively. The third layer 1230 may include Layer 2 to Layer N−1. For example, when the PCB 1200 includes ten layers, the first layer 1210 and the second layer 1220 may be Layer 1 and Layer 10, respectively. The third layer 1230 may include Layer 2 to Layer 9.

The first layer 1210 may have patterns connected to a control element or a radiator. The control element may be an element capable of controlling signals transmitted to antenna elements arranged in an antenna module 1100. The control element may be a telematics control unit, an RF circuit, or an electronic element that may be connected thereto. The second layer 1220 may include the conductive pattern 1220*g* that operates as ground, and the feeding pattern 1220*f*. The second layer 1220 may have a slot 1200*s* which is arranged in an edge portion thereof and from which a conductive pattern is removed.

A structure of the slot 1200*s* from which a conductive pattern is removed is described in detail. The first pattern 1210*p* constituting a first outer peripheral area and the second pattern 1220*p* constituting a second outer peripheral area of the slot 1200*s* may be divided by a slit SL.

Among patterns of the first layer 1210, a pattern that operates as ground may be connected to a conductive pattern that operates as ground of the second layer 1210 through a via. Accordingly, ground may be electrically connected between the multiple layers of the PCB 1200. The feeding pattern 1220*f* may be connected to the first pattern 1210*p* of the second layer 1220 through the connection pattern 1220*c*. The feeding pattern 1220*f* may be referred to as a feeding pad. The feeding pad and the connection pattern 1220*c* may be included to be referred to as a feeding pattern.

The connection pattern 1220*c* may be configured as a plurality of sub-patterns. The connection pattern 1220*c* may include a first sub-pattern 1221*c*, a second sub-pattern 1222*c*, and a third sub-pattern 1223*c*. The first sub-pattern 1221*c* may be connected to the feeding pattern 1220*f*. The first sub-pattern 1221*c* may be arranged in a first axial direction, for example, a vertical direction. The second sub-pattern 1222*c* may be connected to the first sub-pattern 1221*c* and arranged in a second axial direction, for example, a horizontal direction. The third sub-pattern 1223*c* may be connected to the second sub-pattern 1222*c* and arranged in the first axial direction. The third sub-pattern 1223*c* may be connected to an end portion of the first pattern 1210*p* of the first outer peripheral area.

A conductive pattern may be placed on an inner surface of the second cover 1300. The conductive pattern of the second cover 1300 may operate as ground. The conductive pattern of the second cover 1300 may be electrically connected to the first pattern 1210*p* of the second layer 1220. The conductive pattern of the second cover 1300 may be electrically connected to the second pattern 1220*p* of the second layer 1220.

The second cover 1300 may include the conductive portion 1310 and the non-conductive portion 1320. The non-conductive portion 1320 may be configured to be coupled to an opening area OA of the conductive portion 1310. The non-conductive portion 1320 of the second cover 1300 may be configured to overlap the slot 1200*s* of the PCB 1200. Accordingly, signals radiated through the slot 1200*s* of the PCB 1200 may be transmitted into the vehicle through the non-conductive portion 1320 of the second cover 1300.

The antenna module 1000 may further include the added conductive pattern 1250*p*. The added conductive pattern 1250*p* may be connected to a first point in the first outer peripheral area inwardly adjacent to a point connected to the connection pattern 1220*c* through a dielectric contact portion 1230*c*. The added conductive pattern 1250*p* may be arranged to be bent toward inside of the first outer peripheral area.

The first pattern 1210*p* of the first outer peripheral area of the second layer 1220 may be configured to include the first sub-pattern 1211*p* and the second sub-pattern 1212*p*. The slot 1200*s* of the second layer 1220 may be configured to include a first slot area 1210*s* and a second slot area 1220*s*. The slot 1200*s* of the second layer 1220 may further include a third slot area 1230*s* and a fourth slot area 1240*s*.

The first sub-pattern 1211*p* may be connected to the connection pattern 1220*c*. The first sub-pattern 1211*p* may be connected to the feeding pattern 1220*f* through the connection pattern 1220*c*. The second sub-pattern 1212*p* may be connected to the first sub-pattern 1211*p*. The second sub-pattern 1212*p* may define an end portion (an edge portion) of the PCB 1200.

The first slot area 1210*s* may be arranged between the first sub-pattern 1211*p*, and the second pattern 1220*p* of the second outer peripheral area. The second slot area 1220*s* may be arranged between the second sub-pattern 1212*p* and the second pattern 1220*p* of the second outer peripheral area. A second length of the second sub-pattern 1212*p* may be configured to be greater than a first length of the first sub-pattern 1211*p*. A second slot length of the second slot area 1220*s* may be configured to be smaller than a first slot length of the first slot area 1210*s*. Accordingly, the added conductive pattern 1250*p* may be arranged on the first slot area 1210*s*.

As described above, the added conductive pattern 1250*p* may be arranged within an area defined by the second slot area 1220*s*. The added conductive pattern 1250*p* may radiate a signal to an area outside the second cover 1300 through the non-conductive portion 1320 of the second cover 1300. The added conductive pattern 1250*p* may be placed on one surface of the non-conductive portion 1320 of the second cover 1300. The added conductive pattern 1250*p* may be arranged on a front surface of the non-conductive portion 1320 of the second cover 1300. A rear surface of the non-conductive portion 1320 of the second cover 1300 may be arranged to face a metal structure of the vehicle.

The added conductive pattern 1250*p* may be configured as bent sub-patterns. The added conductive pattern 1250*p* may be arranged within the second slot area 1220*s* which is a limited area. The added conductive pattern 1250*p* may be configured to include the first sub-conductive pattern 1251*p* and the second sub-conductive pattern 1252*p*.

The first sub-pattern 1251*p* may be connected to the first pattern 1210*p* of the first outer peripheral area. The first sub-conductive pattern 1251*p* may be arranged in a first axial direction, for example, a vertical direction. The second sub-slot pattern 1252*p* may be connected to the first sub-conductive pattern 1251*p*, and arranged to be bent at an end portion of the first sub-conductive pattern 1251*p*. The second sub-conductive pattern 1252*p* may be arranged to extend from an end portion of the first sub-conductive pattern 1251*p* in a second axial direction perpendicular to the first axial direction, for example, in a horizontal direction. The second conductive pattern 1252*p* may extend from the second slot area 1220*s* to the second sub-pattern 1212*p*. An end portion of the second sub-conductive pattern 1252*p* may be arranged to be apart from an end portion of the second sub-pattern 1212*p* by a predetermined space.

The first pattern 1210*p* of the first outer peripheral area, the second pattern 1220*p* of the second outer peripheral area, and the slot area 1200*s* may constitute an antenna element 1200*r* which is a radiator that radiates signals in a plurality of frequency bands. The antenna element 1200*r* may transmit signals in a plurality of frequency bands into the vehicle through the non-conductive portion 1320 of the second cover 1300. The antenna element 1200*r* may be configured to radiate signals into the vehicle in a plurality of Wi-Fi frequency bands, thereby enabling Wi-Fi communication services to be performed inside the vehicle.

Hereinafter, a current path and electric field distribution in each frequency band of a Wi-Fi antenna operating in a plurality of frequency bands are described. In this regard, FIGS. 8 to 11 illustrate current paths and current distributions at particular frequencies within first to fourth frequency bands. The particular frequencies within the first to fourth frequency bands of FIGS. 8 to 11 may be 2.14 GHz, 3.24 GHz, 5.38 GHz, and 6.42 GHz, respectively, but are not limited thereto.

Figure 8:
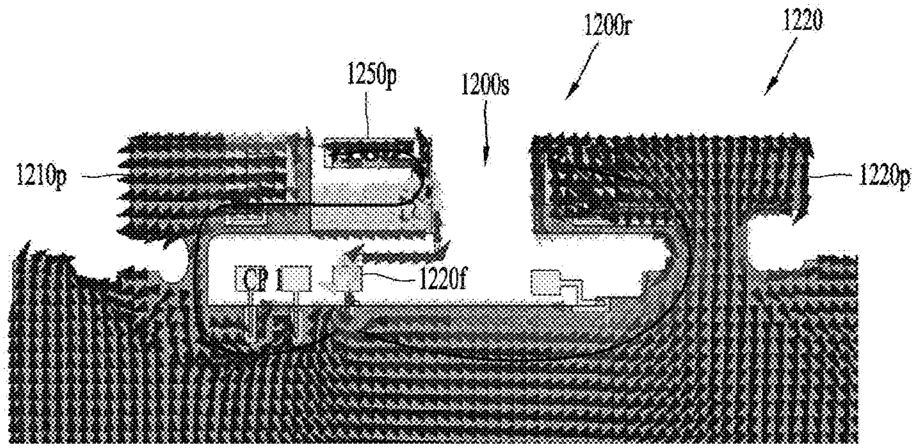
FIGS. 8 to 11 illustrate current paths and current distributions at particular frequencies within first to fourth frequency bands.
Figure 8:
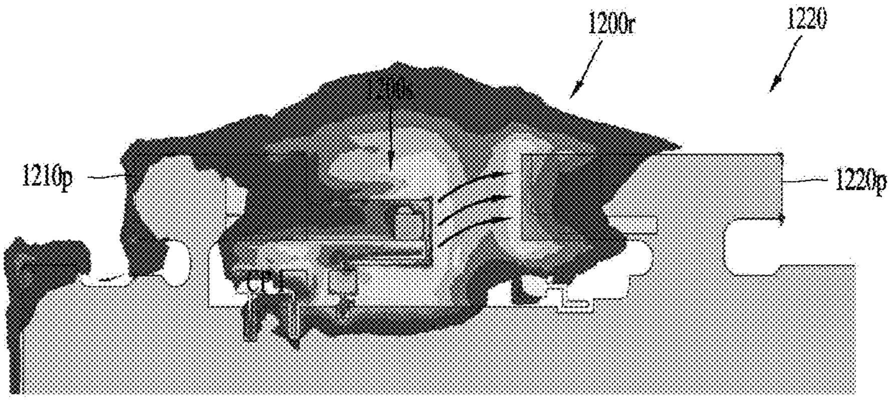

Referring to FIGS. 5A to 7C and (a) of FIG. 8, a first current path in a first frequency band is defined along conductive patterns adjacent to the slot area 1200*s*. The first current path is defined from an end portion of the added conductive pattern 1250*p* along the first pattern 1210*p* of the first outer peripheral area adjacent the slot area on one side. A second current path is defined from an end portion of the second pattern 1220*p* of the second outer peripheral area adjacent to the slot area on another side to a point at which the feeding pattern 1220*f* is arranged. The slot area 1200*s* may operate in a half-wavelength closed slot mode in the first frequency band.

Referring to FIGS. 5A to 7C and (b) of FIG. 8, a first electric field may be coupled from the first pattern 1210*p* of the first outer peripheral area to the second pattern 1220*p* of the second outer peripheral area in the first frequency band. The antenna element 1200*r* may operate in a first mode, which is a closed slot mode, in the first frequency band by the coupled first electric field.

Figure 9:
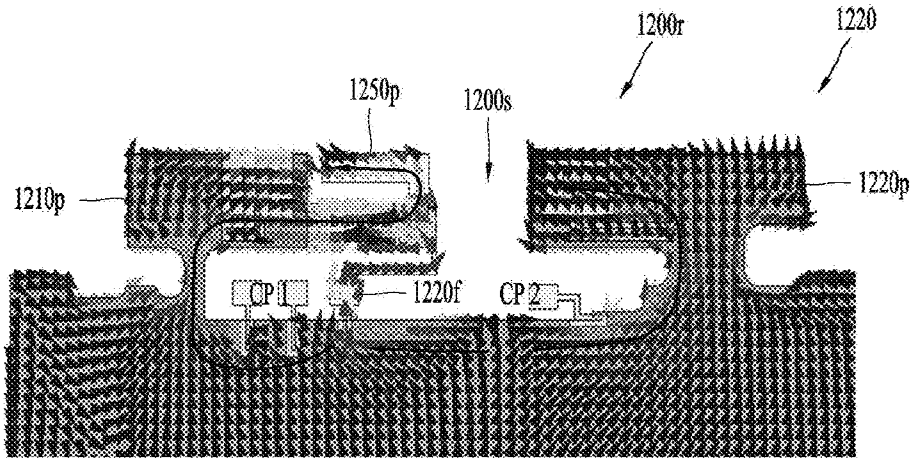
Figure 9:
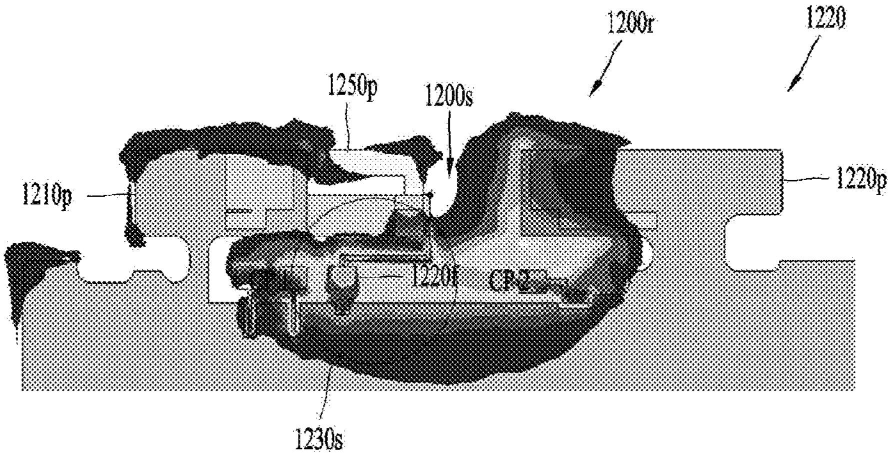

Referring to FIGS. 5A to 7C and (a) of FIG. 9, a third current path in a second frequency band is defined along conductive patterns adjacent to the slot area 1200*s*. The third current path is defined from an end portion of the added conductive pattern 1250*p* along the first pattern 1210*p* of the first outer peripheral area adjacent to the slot area on one side. A direction of the third current path may be defined in a direction opposite to a direction of the first current path of (a) of FIG. 7A. A fourth current path is defined from a point between the feeding pattern 1220*f* and the second conductive pad CP2 to an end portion of the second pattern 1220*p* in the second outer peripheral area adjacent to the slot area on another side. A direction of the fourth current path may be defined in a direction opposite to a direction of the second current path of (a) of FIG. 7A. The slot area 1200*s* may operate in a quadrature-wavelength open slot mode in the second frequency band.

Referring to FIGS. 5A to 7C and (b) of FIG. 9, a second electric field may be generated through the first outer peripheral area and the second outer peripheral area of the slot 1200*s* in the second frequency band. The antenna element 1200*r* may operate in a second mode, i.e., an open slot mode in the second frequency band which is higher than the first frequency band by the second electric field. The second mode, which is an open slot mode, may be constituted due to a strong electric field distribution inside the slot 1200*s*. A field distribution of the third slot area 1230*s* inside the slot 1200*s* may be generated to be higher than that in other slot areas.

Figure 10:
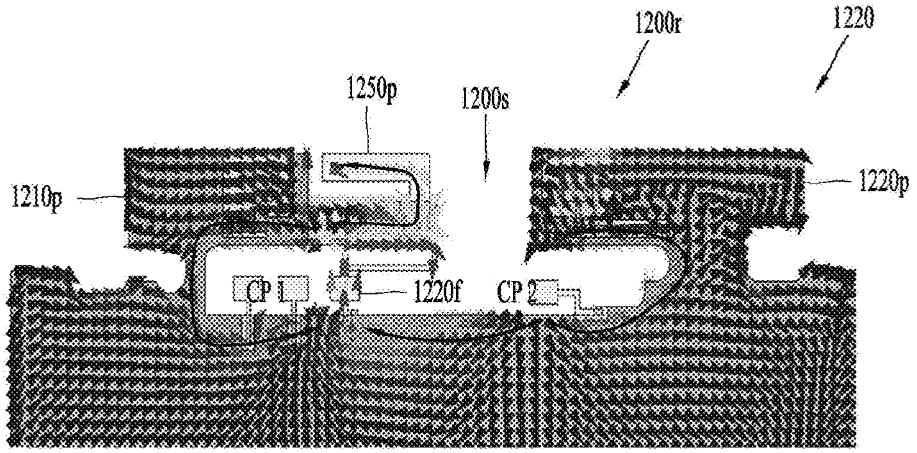
Figure 10:
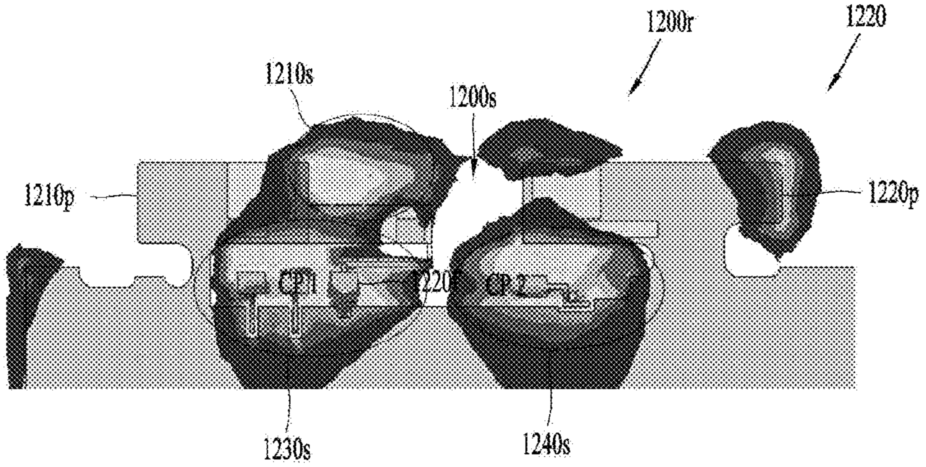

Referring to FIGS. 5A to 7C and (a) of FIG. 10, a current path is defined by the slot 1200*s* and the added conductive pattern 1250*p* with reference to a position of the feeding pattern 1220*f*. A fifth current path in the third frequency band is defined from the first pattern 1210*p* of the first outer peripheral area toward an end portion of the added conductive pattern 1250*p*. The antenna element 1200*r* may operate in a planar inverted-F antenna (PIFA) mode toward the end portion of the added conductive pattern 1250*p*. A direction of the fifth current path may be defined as an opposite direction to that of the first current path of (a) of FIG. 7A, and as a same direction as the third current path of (a) of FIG. 8.

A sixth current path in the third frequency band may be defined through the slot area 1200*s* on one side and another side. A direction of the sixth current path may be defined as an opposite direction to the third current direction of (a) of FIG. 8 on one side of the slot area 1200*s*. The direction of the sixth current path may be defined on another side of the slot area 1200*s* in a same direction as the fourth current direction of (a) of FIG. 8.

Referring to FIGS. 5A to 7C and (b) of FIG. 10, a third electric field may be generated through an area in which the connection pattern 1200*c* is arranged, and the first outer peripheral area and the second outer peripheral area of the slot area 1200*s* in the third frequency band. A peak area of the third electric field may be generated in the first slot area 1210*s*, the third slot area 1230*s*, and the fourth slot area 1240*s*. The third slot area 1230*s* and the fourth slot area 1240*s* may be areas in which the first conductive pad CP1 and the second conductive pad CP2 are arranged, respectively. The antenna element 1200*r* may operate in a planar inverted-F antenna (PIFA) mode toward an end portion of the added conductive pattern 1250*p*. The antenna element 1200*r* may operate in a third mode in which an open slot mode and a PIFA mode are combined with each other in the third frequency band which is higher than the second frequency band due to the third electric field.

Figure 11:
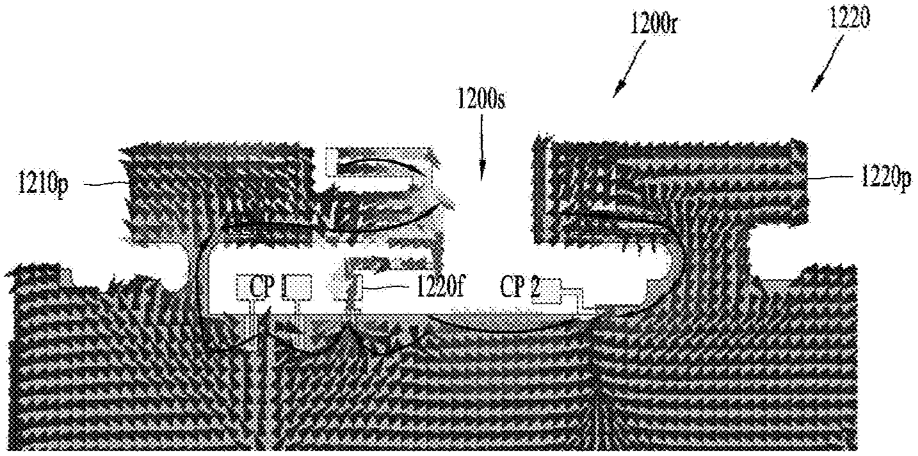
Figure 11:
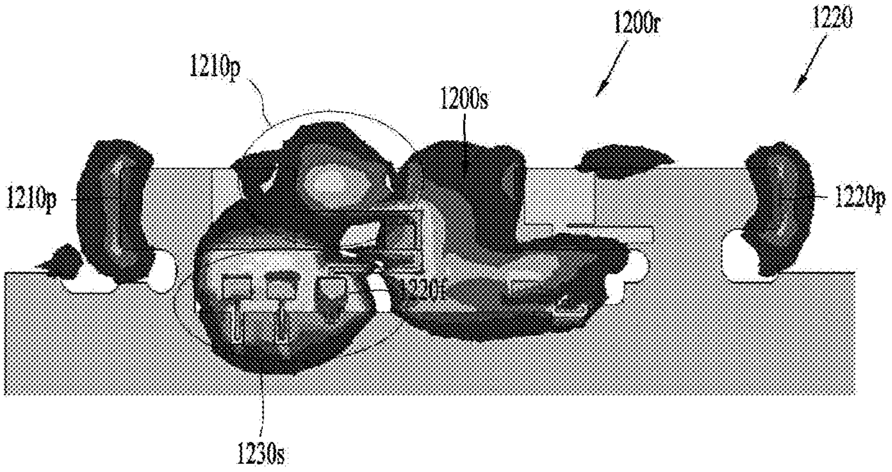

Referring to FIGS. 5A to 7C and (a) of FIG. 11, a current path may be defined in the slot 1200*s* in a quadrature-wavelength open slot mode. A seventh current path in a fourth frequency band is defined from the first pattern 1210*p* of the first outer peripheral area toward an end portion of the added conductive pattern 1250*p*. The antenna element 1200*r* may operate in a planar inverted-F antenna (PIFA) mode toward the end portion of the added conductive pattern 1250*p*. A direction of the seventh current path may be defined from the added conductive pattern 1230 in a direction opposite to a direction of the fifth current path of (a) of FIG. 9A. The direction of the seventh current path may be defined from the first pattern 1210*p* of the first outer peripheral area in a same direction as that of the fifth current path of (A) of FIG. 9A.

An eighth current path in the fourth frequency band may be defined through the slot area 1200*s* on one side and another side. A direction of the eighth current path may be defined from a partial area on one side of the slot area 1200*s* and in other parts in a same direction and an opposite direction to the sixth current direction of (a) of FIG. 9, respectively. The direction of the eighth current path may be defined from another side of the slot area 1200*s* in an opposite direction to that of the sixth current direction of (a) of FIG. 9.

Referring to FIGS. 5A to 7C and (b) of FIG. 11, a fourth electric field may be generated through an area in which the connection pattern 1220*c* is arranged and the first outer peripheral area in the fourth frequency band. A peak area of the fourth electric field may be generated in the first slot area 1210*s* and the third slot area 1230*s*. The third slot area 1230*s* may be an area in which the first conductive pad CP1 is arranged. The antenna element 1200*r* may operate in a planar inverted-F antenna (PIFA) mode toward an end portion of the added conductive pattern 1250*p*. The antenna element 1200*r* may operate in a fourth mode in which an open slot mode and a PIFA mode are combined with each other in the fourth frequency band which is higher than the third frequency band due to the fourth electric field.

As described above, the PCB 1200 may have a multilayer substrate structure in which multiple layers are stacked. The PCB 1200 may further include at least one third layer 1230 arranged between the first layer 1210 and the second layer 1220. The slot area 1200*s* including the first and second slot areas 1210*s* and 1220*s* may further include the third and fourth slot areas 1230*s* and 1240*s*.

The third slot area 1230*s* may be arranged in a region further inward compared to the first pattern 1210*p* to be adjacent to an inner end portion of the first pattern 1210*p* of the first outer peripheral area. The feeding pattern 1220*f* may be arranged in the third slot area 1230*s*. The third slot area 1230*s* may include at least one of conductive pads CP1*a* and CP1*b* adjacent to the feeding pattern 1220*f*. The at least one of conductive pads CP1*a* and CP1*b* may constitute the first conductive pad CP1.

The fourth slot area 1240*s* may be arranged in a region further inward compared the second pattern 1220*p* to be adjacent to an inner end portion of the second pattern 1220*p* of the second outer peripheral area. At least one second conductive pad CP2 may be arranged in the fourth slot area 1240*s*. The fourth slot area 1240*s* may include at least one second conductive pad CP2 arranged between the second pattern 1220*p* of the second outer peripheral area and the third pattern 1230*p*. The third pattern 1230*p* may be configured to connect the first pattern 1210*p* of the first outer peripheral area and the second pattern 1220*p* of the second outer peripheral area. The third pattern 1230*p* may be arranged in a region further inward compared to the first pattern 1210*p* of the first outer peripheral area and the second pattern 1220*p* in the second outer peripheral area.

The slit SL may include the first slit area SL1 in which a dielectric area is removed from the third layer 1230. The first slit area SL1 may be arranged between the first sub-pattern 1210*p* and the at least one of conductive pads CP1*a* and CP1*b*. The slit SL may further include the second slit area SL2 in which a dielectric area is removed from the third layer 1230. The second slit area SL2 may be arranged between the second pattern 1220*p* of the second outer peripheral area and the at least one second conductive pad CP2. A level of interference caused by surface current between radiators of the PCB 1200 may be reduced by the first and second slit areas SL1 and SL2 from which the dielectric area is removed. The first and second slit areas SL1 and SL2 may be arranged to be adjacent to the feeding pattern 1220*f* and the first and second conductive pads CP1 and CP2. Accordingly, a level of interference between radiators arranged on the PCB 1200 or connected to a conductive pattern of the PCB 1200 may be reduced.

Meanwhile, the antenna module according to this specification may further include a plurality of antenna elements 1100-1 to 1100-4 that perform wireless communication in a 4G frequency band and a 5G Sub6 frequency band as illustrated in FIG. 4, in addition to a Wi-Fi antenna operating as a slot antenna structure. In this regard, the plurality of antenna elements 1100-1 to 1100-4 may radiate signals of a particular frequency band to outside of the vehicle through a non-conductive portion of the first cover 1300*u* to perform multiple input/multiple output (MIMO) with entities outside the vehicle.

Figure 12A:
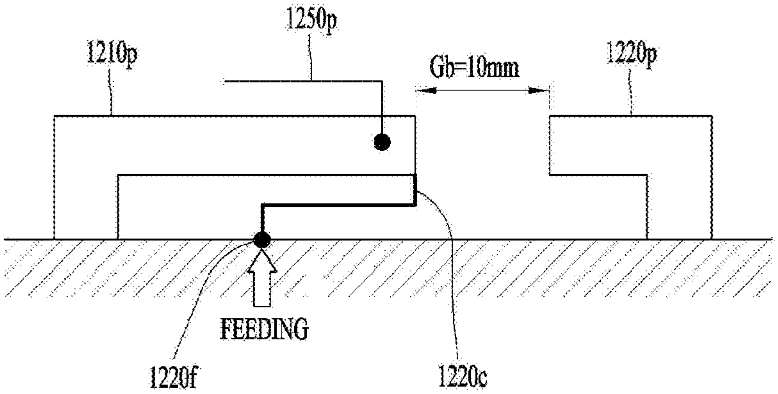
FIG. 12A illustrates a structural diagram of an antenna module implemented on a lower layer of a PCB and an enlarged view of the feeding pattern and a peripheral area between the feeding pattern and the ground pattern.
Figure 12A:
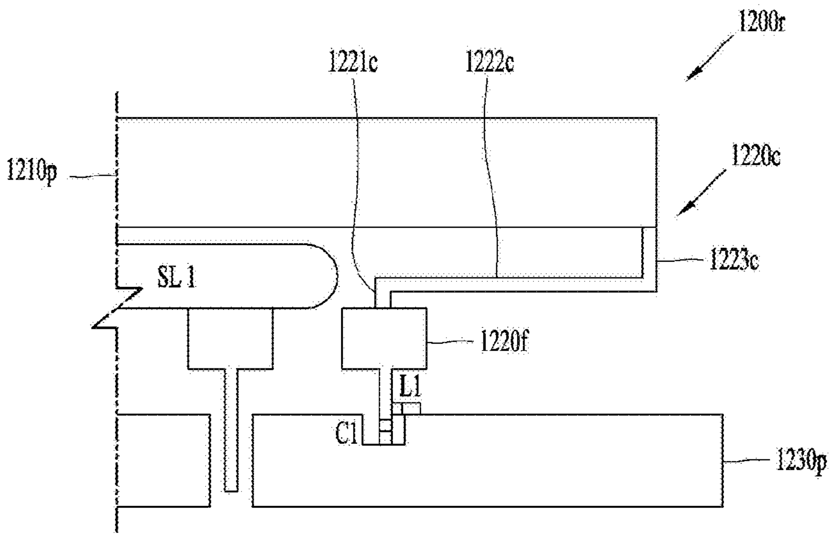
Figure 12B:
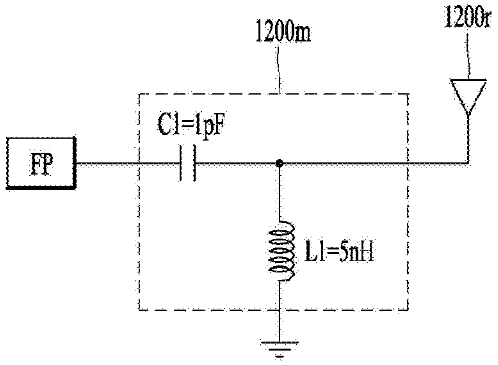
FIG. 12B illustrates an equivalent circuit having an impedance matching circuit implemented between the feeding pattern of FIG. 12A and an antenna element, and reflection coefficient characteristics depending on presence or absence of the impedance matching circuit.
Figure 12B:
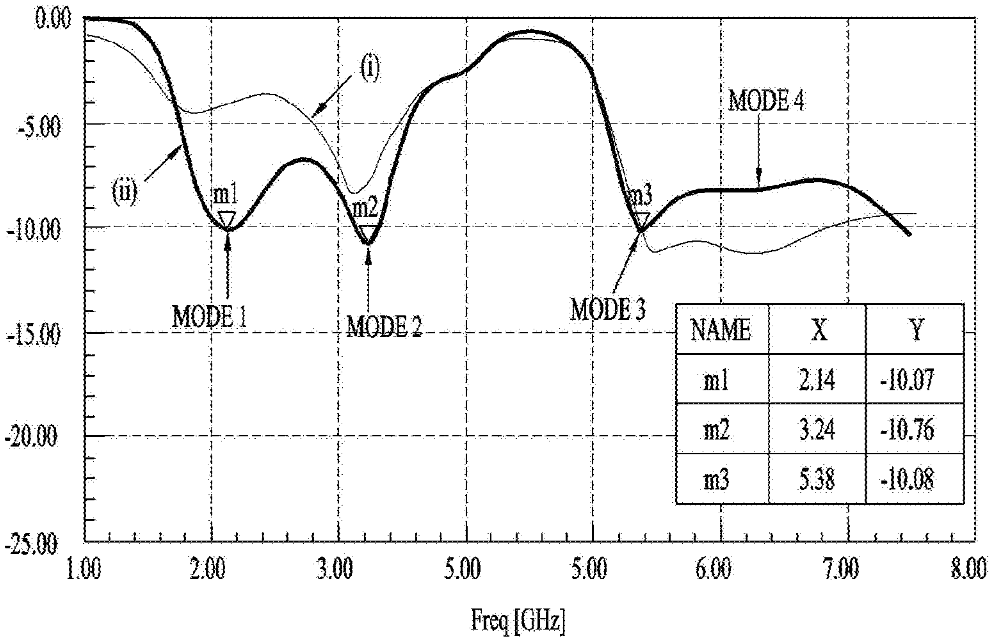

Meanwhile, the antenna module according to this specification may improve antenna characteristics by implementing an impedance matching circuit between a feeding pattern and a ground pattern. In this regard, FIG. 12A illustrates a structural diagram of an antenna module implemented on a lower layer of a PCB and an enlarged view of the feeding pattern and a peripheral area between the feeding pattern and the ground pattern. FIG. 12B illustrates an equivalent circuit having an impedance matching circuit implemented between the feeding pattern of FIG. 12A and an antenna element, and reflection coefficient characteristics depending on presence or absence of the impedance matching circuit.

Referring to FIG. 7A, FIG. 7B and (a) of FIG. 12A, the first pattern 1210*p* and the second pattern 1220*p* of the second layer may be arranged to be spaced apart by a predetermined space G1*b* or Gb. The first pattern 1210*p* and the second pattern 1220*p* of the second layer may be arranged to be apart from each other by G1*b*=9.7 mm or Gb=10 mm. The feeding pattern 1220*f* may be connected to a first point of the first pattern 1210*p* through the connection pattern 1220*c*. The first point of the first pattern 1210*p* may be set as one end portion of the first pattern 1210*p*, but is not limited thereto. The added conductive pattern 1250*p* may be connected to a second point on an inner side of an end portion of the first pattern 1210*p*.

Referring to FIGS. 7A and 7B, and FIG. 12A to (a) of FIG. 12B, a feeding port FP is connected to the antenna element 1200*r* through a capacitor C1 connected in series with the feeding pattern 1220*f* and an inductor L1 connected in parallel with ground. A capacitance value of the capacitor C1 and an inductance value of the inductor L1 may be set to values within a predetermined range from 1 pF and 5 nH, respectively. The antenna element 1200*r* may include the first pattern 1210*p* and the second pattern 1220*p* each arranged on a second layer.

Referring to (a) of FIG. 12 and (b) of FIG. 12B, an impedance matching circuit 1200*m* including the capacitor C1 and the inductor L1 may be placed between the feeding port FP and the antenna element 1200*r*. (b) of FIG. 11B shows reflection coefficient characteristics of an antenna depending on presence or absence of an impedance matching circuit 1200*m*. Referring to (i) a structure in which an impedance matching circuit is not arranged shown in (b) of FIG. 11B, a reflection coefficient has a value of approximately −5 dB in a first frequency band and a second frequency band. Referring to (ii) a structure in which an impedance matching circuit is arranged as shown in (b) of FIG. 11B, a reflection coefficient has a value of −10 dB or less at a center frequency of the first frequency band and the second frequency band. Therefore, compared to (i) the structure in which an impedance matching circuit is not arranged, (ii) the structure in which an impedance matching circuit is arranged has improved antenna characteristics in the first frequency band and the second frequency band.

Figure 13:
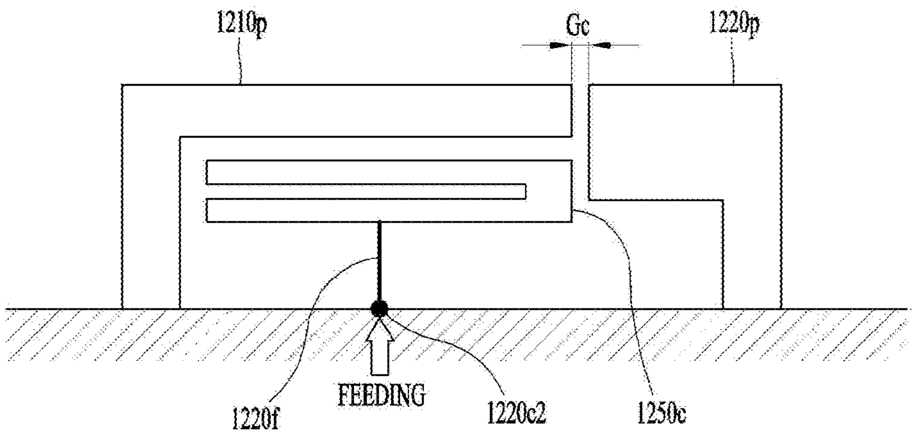
FIG. 13 illustrates a structure in which a separate conductive pattern constituting a coupling structure is arranged in a slot area.
Figure 13:
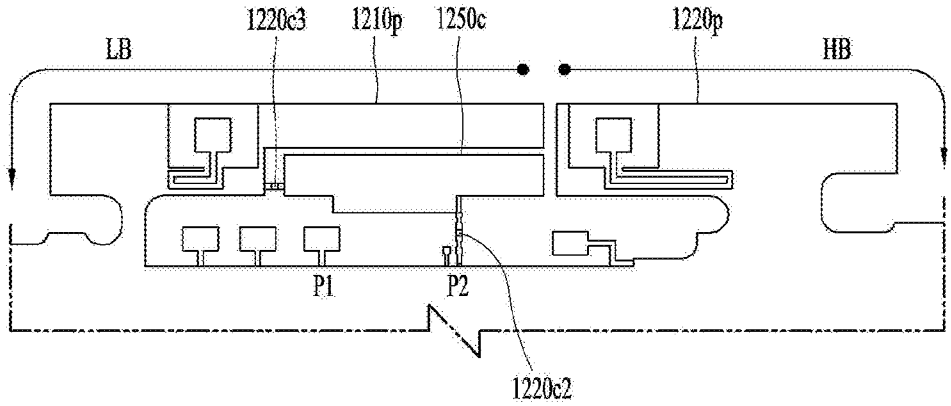
Figure 14:
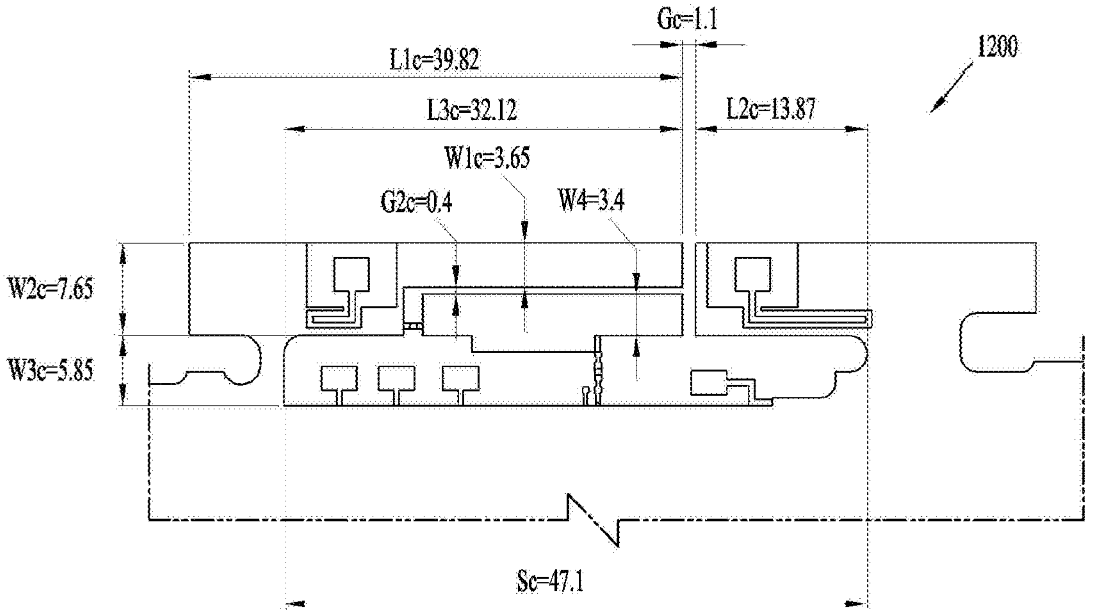
FIG. 14 illustrates values of each structure of an antenna module of the coupling structure of FIG. 13.

Meanwhile, the antenna module according to this specification may be configured such that a separate conductive pattern is arranged in a slot area to be coupled to first and second patterns of a second layer and connected to a third pattern. In this regard, FIG. 13 illustrates a structure in which a separate conductive pattern constituting a coupling structure is arranged in a slot area. FIG. 14 illustrates values of each structure of an antenna module of the coupling structure of FIG. 13.

Referring to (a) of FIG. 13 and FIG. 14, the added conductive pattern 1250*c*, which is a separate conductive pattern constituting a coupling structure, may be connected to the feeding pattern 1220*f* through a connection pattern 1220*c*2. The added conductive pattern 1250*c* may be implemented as a PCB separate from the PCB 1200 having a multilayer substrate structure or as a separate conductive pattern on the second layer of the PCB 1200 The added conductive pattern 1250*c* constitutes a coupling structure, and thus, may be referred to as a coupling pattern. The first pattern 1210*p* and the second pattern 1220*p* of the second layer may be arranged to be apart from each other by a predetermined space Gc. In this regard, the space Gc between the first pattern 1210*p* and the second pattern 1220*p*, as shown in (a) of FIG. 12, may be configured to be smaller than a gap Gb between the first pattern 1210*p* and the second pattern 1220*p* shown in (a) of FIG. 11A.

Referring to (b) of FIG. 13 and FIG. 14, a signal of a low band (LB) among Wi-Fi frequency bands may be radiated through the first pattern 1210 of the second layer. A Wi-Fi radiator may be implemented in the low band (LB) through the coupling structure of the added conductive pattern 1250*c* and the first pattern 1210. A signal of a high band (HB) among the Wi-Fi frequency bands may be radiated through the second pattern 1220 of the second layer. End portions of the added conductive pattern 1250*c* may be arranged to be apart from an end portion of the first pattern 1210 and an end portion of the second pattern 1220 of the second layer by a predetermined gap distance to constitute a coupling structure. The added conductive pattern 1250*c* may be connected to the third pattern 1230*p* through a connection pattern 1220*c*2 at a second point P2 different from the first point P1 connected to the feeding pattern of FIG. 6A. The second point P2 may be arranged in an area further outward compared to the first point P1. The feeding pattern of the first point P1 may also be connected to other antenna elements. The added conductive pattern 1250*c* may also be connected to the first pattern 1230*p* via a second connection pattern 1220*c*3.

An antenna element having a first structure of FIG. 7C and an antenna element having a second structure of FIGS. 13B and 14 are described. Slot lengths Sc of the antenna element having the first structure and the antenna element having the second structure may be identically set to 47.1 mm. A width W2*b* of the first pattern of the first structure and a width W2*c* of the first pattern of the second structure may be set to be identical. A width W3*b* of the first pattern of the first structure and a width W3*c* of the first pattern of the second structure may be set to be identical.

A length L1*c* of the first pattern of the second structure may be configured to be greater than a length L1*b* of the first pattern of the first structure. Accordingly, a gap space Gc of the second structure may be set to about 1.1 mm to be smaller than a gap space G1*b* of the first structure. A gap space G2*c* with the first pattern of the added conductive pattern 1250*c* may be set to be apart, for example, by about 0.4 mm. Accordingly, a Wi-Fi radiator may be implemented in the low band (LB) through a coupling structure of the added conductive pattern 1250*c* and the first pattern 1210.

Figure 15:
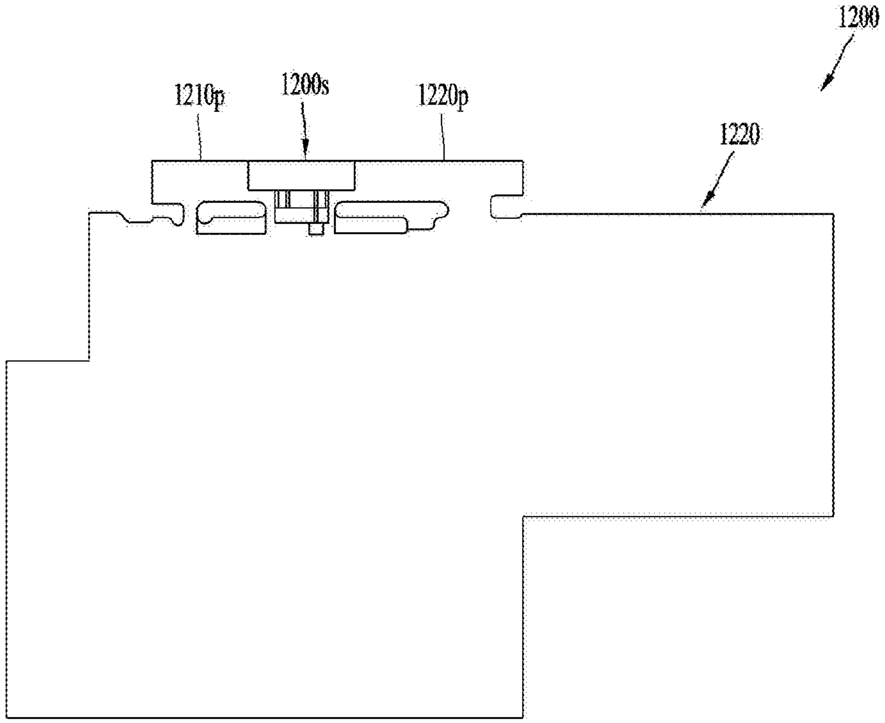
FIG. 15 illustrates a front view and a side perspective view of a lower layer of a PCB constituting an antenna module.
Figure 15:
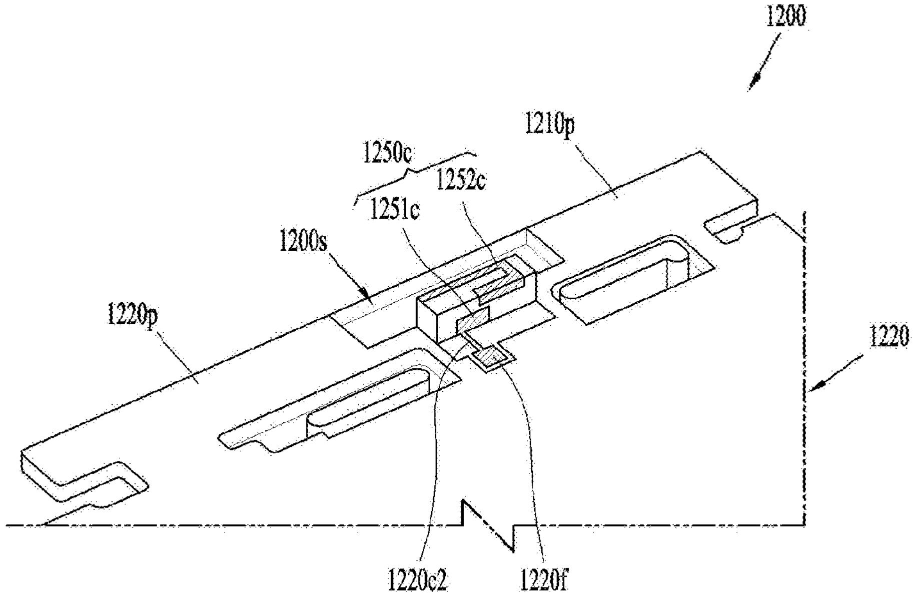
Figure 16:
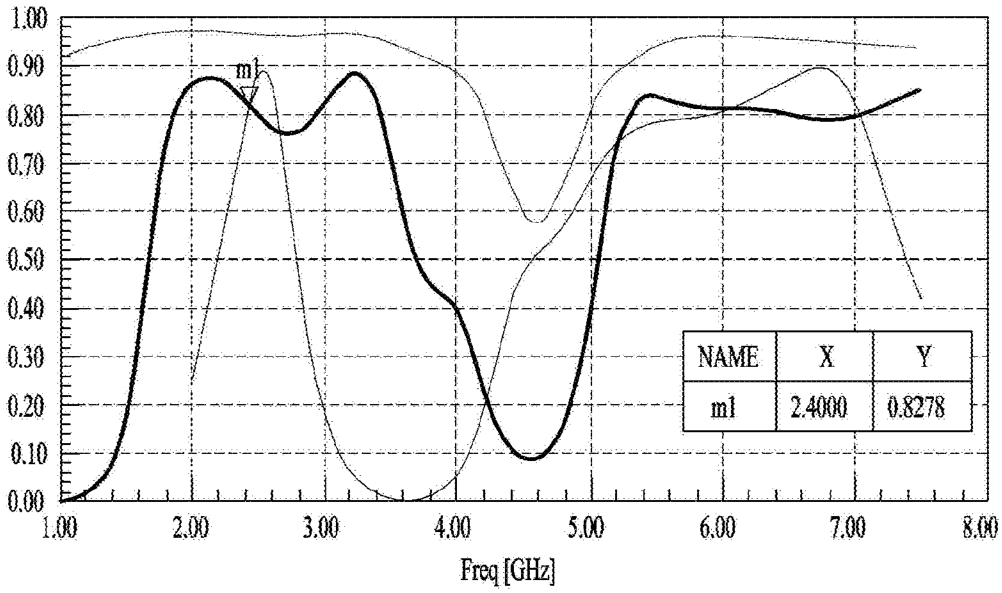
FIG. 16 shows comparison of efficiency characteristics between an antenna having a first structure of FIG. 7A and an antenna having a second structure of FIG. 15.

Meanwhile, a conductive pattern of an antenna module of the coupling structure according to this specification may be configured as a structure printed on a dielectric structure within a slot area. In this regard, FIG. 15 illustrates a front view and a side perspective view of a lower layer of a PCB constituting an antenna module. FIG. 16 shows comparison of efficiency characteristics between an antenna having the first structure of FIG. 7A and an antenna having a second structure of FIG. 15.

Referring to (a) of FIG. 15, a conductive pattern of a second layer 1220 may be arranged on a rear surface of the PCB 1200 configured as a multilayer substrate. The slot 1200*s* may be arranged between the first pattern 1210*p* and the second pattern 1220*p* of the second layer 1220. Referring to (b) of FIG. 15, a dielectric of the PCB 1200 may be removed from the slot 1200*s* and a separate dielectric carrier may be arranged in the slot 1200*s*. A first added conductive pattern 1251*c* and a second added conductive pattern 1252*c* may be arranged on the dielectric carrier to have a coupling structure. The first added conductive pattern 1251*c* and the second added conductive pattern 1252*c* may constitute the added conductive pattern 1250*c*. The feeding pattern 1220*f* may be connected to the first added conductive pattern 1251*c* arranged on one surface of the dielectric carrier through the connection pattern 1220*c*.

Referring to FIG. 7A and FIG. 16, (i) an antenna having a first structure has an antenna efficiency of 0.8 to 0.9 in a first frequency band and a second frequency band, i.e., a low band. Referring to FIGS. 14 to 16, at 2.4 GHz, (ii) an antenna having a second structure has higher antenna efficiency but has narrow band characteristics compared to (i) the antenna having the first structure. In this regard, (i) the antenna having the first structure has a separate added conductive pattern 1250*p* arranged in addition to the first pattern and the second pattern, thereby having high antenna efficiency in a whole of the first frequency band and the second frequency band, which are low bands. On the other hand, (ii) the antenna having the second structure has the first pattern and the second pattern arranged to have a narrow gap space therebetween. Thus, the separate added conductive pattern 1250*c* cannot be arranged. The antenna having the second structure is configured to have a resonant structure in the low band by arranging an added conductive pattern 1250*c* in a slot area below the first pattern 1210*p* instead of the added conductive pattern 1250*p*.

Thus, as described above, (ii) the antenna having the second structure has higher antenna efficiency, but has narrow band characteristics compared to (i) the antenna having the first structure. Accordingly, (ii) the antenna having the second structure may be arranged to implement a high-efficiency Wi-Fi antenna with a narrow band at a center frequency of 2.4 GHz. On the other hand, (i) the antenna having the first structure may be arranged to achieve high antenna efficiency throughout a whole of the first frequency band and the second frequency band.

Figure 17:
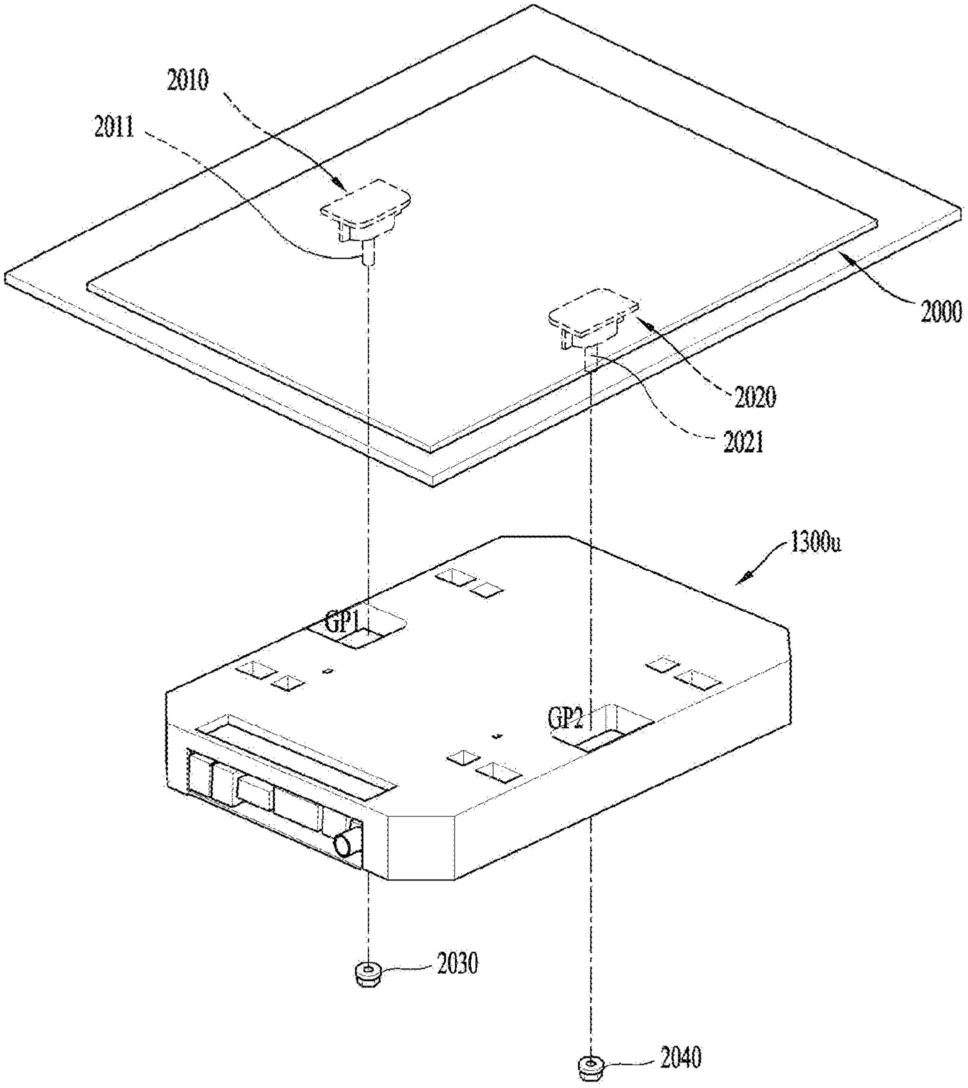
FIG. 17 is a perspective view in which an antenna module structure according to this specification is combined with a roof structure of a vehicle.

A vehicle antenna module according to this specification may be combined with a roof structure of a vehicle. In this regard, FIG. 17 illustrates perspective view in which an antenna module structure according to this specification is combined with a roof structure of a vehicle. In this regard, the roof structures 2000*a*, 2000*b*, and 2000*c* of FIGS. 1A to 1C may be configured as a roof structure 2000 as shown in FIG. 17. Meanwhile, the roof structure 2000 of a vehicle equipped with an antenna module may include a first fixing part 2010 and a second fixing part 2020 as shown in FIG. 17. A first cover 1300*u* corresponding to an upper cover may have a first groove portion GP1 and a second groove portion GP2.

The upper cover 1300*u* may have the first groove portion GP1 and the second groove portion GP2 arranged in an area in which the first protrusion portion 1301 and the second protrusion portion 1302 of the lower cover 1300 are placed to be combined with the upper roof structure 2000 of the vehicle. In correspondence with the area in which the first groove portion GP1 and the second groove portion GP2 are arranged, the roof structure 2000 may have the first fixing part 2010 and the second fixing part 2020. The first fixing part 2010 and the second fixing part 2020 may be inserted into the first groove portion GP1 and the second groove portion GP2 to be coupled to a lower roof structure through a first protruding part 2011 and a second protruding part 2021, respectively.

The first fixing part 2010 and the first protruding part 2011 may be configured to be fixed by a first coupling member 2030 through the first groove portion GP1. The second fixing part 2020 and the second protruding part 2021 may be configured to be fixed by a second coupling member 2040 through the second groove portion GP2. In this regard, the first fixing part 2010 and the second fixing part 2020 may include a bolt shape. An end portion of the first fixing part 2010 may be implemented as a first fastening part 2011 having a bolt shape. An end portion of the second fixing part 2020 may be implemented as a second fastening part 2021 having a bolt shape. The first coupling member 2030 and the second coupling member 2040 may include a nut shape. Accordingly, the first coupling member 2030 and the second coupling member 2040 each having a nut shape may be fastened with the first fastening part 2011 and the second fastening part 2021.

In a fastening structure between the roof structure 2000 of the vehicle and an antenna module, the first and second fixing parts 2010 and 2020 and the first and second coupling structures 2030 and 2040 may be made of a metallic material. The first and second fastening parts 2011 and 2021 having a bolt shape arranged in end portions of the first and second fixing parts 2010 and 2020, respectively, may also be made of a metallic material. Accordingly, ground of the roof structure 2000 of the vehicle may be electrically connected to ground of the antenna assembly 1000. Meanwhile, an outer fixing member placed to surround the first and second fastening members 2011 and 2021 is not limited to a metallic material. The outer fixing member placed to surround the first and second fastening members 2011 and 2021 may be made of a dielectric material when rigidity is maintained.

The vehicle antenna module according to one aspect of this specification has been described. Hereinafter, a vehicle including an antenna module for a vehicle according to another aspect of the specification will be described. In this regard, the description of all the configurations and technical features described above may also be applied to a vehicle including a vehicle antenna module to be described below.

Figure 18:
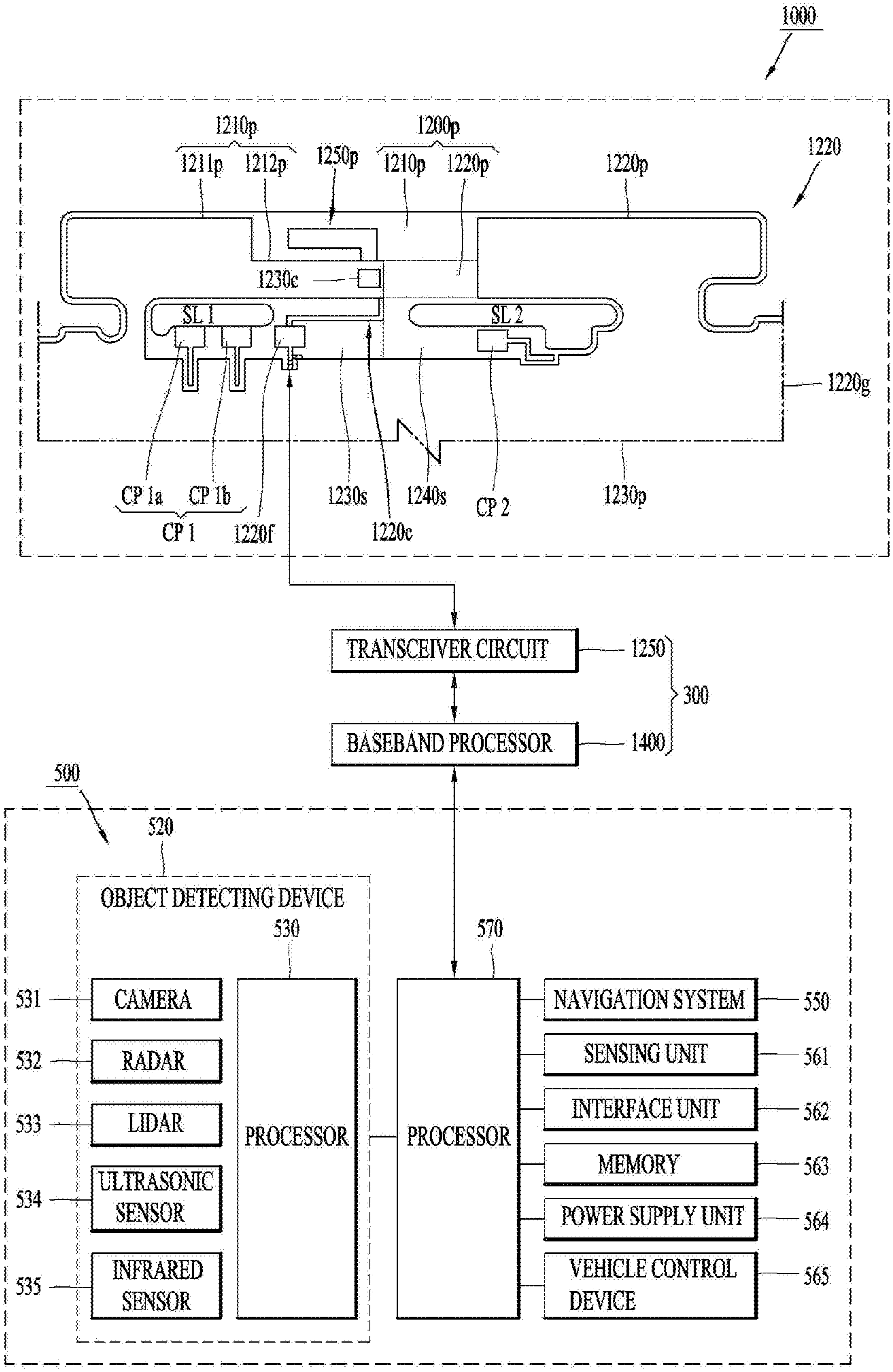
FIG. 18 is a configuration diagram of an antenna module according to an embodiment and a vehicle on which the antenna module is mounted.

Meanwhile, FIG. 18 is a block diagram illustrating an antenna module and a vehicle in which the antenna module is mounted according to the present disclosure. Specifically, FIG. 18 is a block diagram of a vehicle illustrating that an antenna module corresponding to an antenna module is mounted inside a roof of the vehicle to perform communications with adjacent electronic devices, vehicles, infrastructures.

Referring to FIG. 18, the antenna module 1000 may be mounted in the vehicle. The antenna module 1000 may perform short-range communication, wireless communication, V2X communication, and the like by itself or through the communication device 400 of FIG. 3. To this end, the baseband processor 1400 may perform control such that a signal is received from or transmitted to the adjacent vehicle, the RSU, and the base station through the antenna module 1000.

The baseband processor 1400 may perform control such that a signal is received from or transmitted to the adjacent vehicle, the RSU, the adjacent object, and the base station through the communication device 400. Here, the information related to adjacent objects may be acquired through an object detection device, such as the camera 531, the radar 532, the LiDar 533, and the sensors 534 and 535 of the vehicle 300. Alternatively, the baseband processor 1400 may control the communication device 400 and the antenna module 1000 such that a signal is received from or transmitted to the adjacent vehicle, the RSU, the adjacent object, and the base station.

Meanwhile, referring to FIGS. 1A to 18, the vehicle 500 having the antenna module 1000 may include the plurality of antennas 1100, the transceiver circuit 1250, and the baseband processor 1400. The vehicle 500 may further include an object detection device 520. The vehicle 500 may further include the communication device 400. Here, the communication device 400 may be configured to perform wireless communication through the antenna module.

Referring to FIGS. 1A to 18, the vehicle 500 may include the antenna module 1000. The antenna module 1000 may be arranged on the bottom of the roof of the vehicle, and perform communication with at least one of an adjacent vehicle, a road side unit (RSU), and a base station through the processor. Since the antenna module 1000 performs telematics operations through wireless communication in the vehicle, it may also be referred to as a telematics module.

Hereinafter, referring to FIGS. 1A to 18, the vehicle 500 having the antenna module 1000 according to another aspect of this specification will be described. The vehicle 500 includes the roof structure 2000 of the vehicle and the antenna module 1000 arranged on the roof structure 2000. The vehicle 500 may further include the processor 1400 placed inside or outside the antenna module 1000 and configured to communicate with at least one of an adjacent vehicle, a road side unit (RSU), and a base station. The processor 1400 may be configured to control the antenna module 1000 through the transceiving circuit 1250.

The roof structure 2000 may be configured as an outer appearance of the vehicle. The roof structure 2000 may include the first fixing part 2010 and the second fixing part 2020. The antenna module 1000 may be arranged on the roof structure 2000.

The antenna module 1000 may include the first cover 1300*u* and the second cover 1300 configured to be coupled to the first cover 1300*u*. The antenna module 1000 may include a printed circuit board (PCB) 1200 having multi-layers arranged inside the first cover 1300*u* and the second cover 1300.

The PCB 1200 having the multi-layers may include the first layer 1210 having patterns that may be connected to a control element or a radiator. The PCB 1200 may include the second layer 1200 including the conductive pattern 1220*g* configured to operate as ground and the feeding pattern 1220*f*. The second layer 1200 may have the slot 1200 which is arranged in an edge portion thereof and from which a conductive pattern is removed.

The first pattern 1210*p* constituting a first outer peripheral area and the second pattern 1210*p* constituting a second outer peripheral area of the slot 1200*s* may be divided by the slot areas 1210*s* and 1220*s* which are dielectric areas from which a conductive pattern is removed. Among patterns of the first layer 1210, a pattern that operates as ground may be connected to a conductive pattern of the second layer 1220 through a via. The feeding pattern 1220*f* may be connected to the first pattern 1210*p* through the connection pattern 1220*c*. A conductive pattern may be placed on an inner surface of the second cover 1300. The conductive pattern of the second cover 1300 may be electrically connected to the first pattern 121*p*. The second cover 1300 may include the non-conductive portion 1320. The non-conductive portion 1320 may be configured to overlap the slot 1200*s* of the PCB 1200 to radiate signals in a plurality of frequency bands.

The antenna module may further include the added conductive pattern 1250*p*. The added conductive pattern 1250*p* may be connected to a first point in the first outer peripheral area inwardly adjacent to a point connected to the connection pattern 1220*c* through the dielectric contact portion 1230*c*, and arranged to be bent toward inside of the first outer peripheral area.

The first pattern 1210*p* of the first outer peripheral area may include the first sub-pattern 1211*p* connected to the connection pattern 1220*c*. The first pattern 1210*p* of the first outer peripheral area may further include the second sub-pattern 1212*p* connected to the first sub-pattern 1211*p* and constituting an end portion of the PCB.

The slot area may include the first slot area 1210*s* arranged between the first sub-pattern 1211*p* and the second outer peripheral area, and the second slot area 1220*s* arranged between the second sub-pattern 1212*p* and the second outer peripheral area. The slot area may include the third slot area 1230*s* in which the feeding pad 1220*f* is arranged. A second length of the second sub-pattern 1212*p* may be configured to be greater than a first length of the first sub-pattern 1211*p*. A second slot length of the second slot area 1220*s* may be configured to be smaller than a first slot length of the first slot area 1210*s*. The added conductive pattern 1250*p* may be arranged within an area located in the first slot area 1210*s*. The added conductive pattern 1250*p* may radiate signals in a plurality of frequency bands through the non-conductive portion 1320 of the second cover 1300.

The antenna element 1200*r* that radiates signals in a plurality of frequency bands through the first pattern 1210*p* of the first outer peripheral area, the second pattern 1220*p* of the second outer peripheral area, and the slot area 1200*s* may be arranged. The antenna element 1200*r* may transmit signals in the plurality of frequency bands into the vehicle through the non-conductive portion 1320 of the second cover 1300.

A first electric field may be coupled from the first outer peripheral area to the second outer peripheral area in the first frequency band. A second electric field may be generated through the first outer peripheral area and the second outer peripheral area of the slot 1200*s* in a second frequency band higher than the first frequency band. The antenna element 1200*r* may operate in a first mode, which is a closed slot mode, in the first frequency band by the coupled first electric field. The antenna element 1200*r* may operate in a second mode, i.e., an open slot mode in the second frequency band by the second electric field.

A third electric field may be generated through an area in which the connection pattern 1220*c* is arranged, the first outer peripheral area, and the second outer peripheral area in the third frequency band. A fourth electric field may be generated through an area in which the connection pattern 1220*c* is arranged and the first outer peripheral area in the fourth frequency band which is higher than the third frequency band. In the area in which the connection pattern 1220*c* is arranged, the connection pattern 1220*c* may be connected to the first pattern 1210*p* and operate in the planar inverted-F antenna (PIFA) mode. The antenna element 1200*r* may operate in a third mode in which the open slot mode and the PIFA mode are combined with each other in the third frequency band higher than the second frequency band by the third electric field. The antenna element 1200*r* may operate in a fourth mode in which the open slot mode and the PIFA mode are combined with each other in a fourth frequency band by the fourth electric field.

The transceiver circuit 1250 may be operably coupled to each radiator module 1100. The processor 1400 may be operably coupled to the transceiver circuit 1250. The processor 1400 may be a baseband processor corresponding to a modem, but is not limited thereto and may be any processor that controls the transceiver circuit 1250. The processor 1400 of the vehicle may be implemented as a network access device (NAD) and may be referred to as a wireless communication control element.

The transceiver circuit 1250 may be operably coupled to the MIMO antennas ANT1 to ANT4. The transceiver circuit 1250 may include a front end module (FEM) such as a power amplifier or a receiving amplifier. As another example, the front end module (FEM) may be arranged between the transceiver circuit 1250 and the antenna, separately from the transceiver circuit 1250. The transceiver circuit 1250 may control the amplitude and/or phase of signals transmitted to the MIMO antennas ANT1 to ANT4 or control only some antenna modules to operate by adjusting the gain or input or output power of the power amplifier or the receiving amplifier.

The processor 1400 may be operably coupled to the transceiver circuit 1250 and may be configured to control the transceiver circuit 1250. The processor 1400 may control the transceiver circuit 1250 to control the amplitude and/or phase of the signals transmitted to the MIMO antennas ANT1 to ANT4 or to operate only some antenna modules. The processor 1400 may perform communication with at least one of the adjacent vehicle, the RSU, and the base station through the transceiver circuit 1250.

In a case where there is a need to simultaneously receive information from various entities such as the adjacent vehicle, the RSU, and the base station for autonomous driving, etc., information may be received and transmitted through MIMO. Accordingly, the vehicle may improve its communication capacity by receiving different information from various entities at the same time. Therefore, the communication capacity of the vehicle may be improved through the MIMO without increasing a bandwidth.

Alternatively, the vehicle may simultaneously receive the same information from various entities, so as to improve reliability of surrounding information and decrease latency. Accordingly, ultra reliable low latency communication (URLLC) may be performed in the vehicle and the vehicle may operate as a URLLC UE. To this end, a base station that performs scheduling may preferentially allocate a time slot for the vehicle operating as the URLLC UE. For this, some of specific time-frequency resources already allocated to other UEs may be punctured.

As described above, the plurality of antennas ANT1 to ANT4 for 4G/5G communications within the antenna module 1000 may operate in the full band including the low band (LB), the mid band (MB), and the high band (HB). Here, the low band (LB) may be referred to as the first (frequency) band and the mid band (MB) and the high band (HB) may be referred to as the second (frequency) band. As another example, when the antenna system 1000 operates in the mid band (MB) and the high band (HB), the middle band (MB) is referred to as a first (frequency) band and the high band (HB) is referred to as a second (frequency) band. The 5G Sub6 band may be the same band as the LTE band in case of LTE re-farming. When 5G NR operates in a band separate from LTE, it may operate in the high band (HB) or a higher band. The 5G Sub6 band operating in the high band (HB) or higher band may also be referred to as a second (frequency) band.

The baseband processor 1400 may perform MIMO through some of the plurality of antennas ANT1 to ANT4 in the first frequency band. Also, the baseband processor 1400 may perform MIMO through some of the plurality of antennas ANT1 to ANT4 in the second frequency band. In this regard, MIMO may be performed by using antenna elements that are sufficiently spaced apart from each other and arranged by being rotated at a predetermined angle. This may improve isolation between the first and second signals within the same band.

The baseband processor 1400 may control the transceiver circuit 1250 to receive the second signal of the second frequency band while receiving the first signal of the first frequency band through one of the first to fourth radiators ANT1 to ANT4. In this case, there may be an advantage that carrier aggregation (CA) may be performed through one antenna.

Alternatively, the baseband processor 1400 may control the transceiver circuit 1250 to receive the first signal of the second band through any one of the second radiator ANT2 and the fourth radiator ANT4 while receiving the first signal of the second band through any one of the first radiator ANT1 and the third radiator ANT3. In this case, there may be an advantage in that each antenna may be designed to optimally operate in a corresponding band.

Therefore, the baseband processor 1400 may perform carrier aggregation (CA) through a combination of the first frequency band and the second frequency band. When it is necessary to receive a large amount of data for autonomous driving or the like, reception in a broad band may be allowed through the CA.

Accordingly, enhanced mobile broad band (eMBB) communication may be performed in the vehicle and the vehicle may operate as an eMBB UE. To this end, a base station performing scheduling may preferentially allocate broadband frequency resources for the vehicle operating as the eMBB UE. To this end, the CA may be performed on frequency bands that are available, except for frequency resources already allocated to other vehicles.

Regard the frequency band, the low band (LB), the mid band (MB), and the high band (HB) may be referred to as the first band, the second band, and the third band, respectively. The antenna system 1000 may operate as a single antenna in the first band, the second band, and the third band corresponding to the low band (LB), the middle band (MB), and the high band (HB). In this regard, the processor 1400 may determine a resource region allocated through a physical downlink control channel (PDCCH). The processor 1400 may control the transceiver circuit 1250 to perform carrier aggregation in two or more of the first to third bands based on the allocated resource region.

The processor 1400 may perform MIMO in an EN-DC state through the first to fourth radiators ANT1 to ANT4. For example, an EN-DC operation may be performed through the first radiator ANT1 and the second radiator ANT2, and MIMO may be performed through the third radiator ANT3 and the fourth radiator ANT4.

In this regard, when the EN-DC operation is performed between a 4G/5G communication system and a WiFi communication system using different bands, the EN-DC operation may be performed through a plurality of antennas in one antenna system. Accordingly, an interference level between MIMO streams using the same band may be reduced. On the other hand, when the EN-DC operation is performed between the 4G and 5G communication systems using the same band, the EN-DC operation may be performed through a plurality of antennas in different antenna systems. In this instance, to reduce the interference level in the low band (LB), the MIMO operation through the plurality of antennas in the same antenna system may be performed in the mid band (MB) or higher.

It will be clearly understood by those skilled in the art that various modifications and alternations for the aforementioned implementations related to the antenna system having the plurality of antennas, the vehicle having the antenna system, and the control operations thereof are made without departing from the idea and scope of the disclosure. Therefore, it should be understood that such various modifications and alternations for the implementations fall within the scope of the appended claims.

In the above, an antenna module having a broadband antenna mounted on a vehicle and a vehicle including the antenna module have been described. The technical effects of such antenna module having the broadband antenna mounted on the vehicle and the vehicle equipped with the antenna module will be described as follows.

According to this specification, an antenna module arranged on a roof structure of a vehicle to be located outside the vehicle may radiate a wireless signal into the vehicle through a non-conductive portion of a lower cover.

According to this specification, an antenna module arranged on a roof structure of a vehicle may transmit a Wi-Fi wireless signal into the vehicle through an antenna element having a slot structure and a non-conductive portion of a lower cover.

According to this specification, an antenna element that resonates in multiple bands in Wi-Fi frequency bands through conductive patterns and an added conductive pattern arranged in a slot area in an antenna module for a vehicle may be provided.

According to this specification, an antenna structure that operates in multiple modes may be provided by defining different current paths according to Wi-Fi frequency bands through conductive patterns and an added conductive pattern arranged in a slot area in an antenna module of a vehicle.

According to this specification, by arranging a fourth-generation (4G)/fifth-generation (5G) antenna and a Wi-Fi antenna for multiple input/multiple output (MIMO) on front and rear surfaces of a printed circuit board (PCB), respectively, a configuration capable of maintaining isolation while optimizing performance of both the 4G/5G antenna and the Wi-Fi antenna may be provided.

According to this specification, by arranging a 4G/5G antenna and a Wi-Fi antenna on front and rear surfaces of a PCB, respectively, antenna performance may be improved, while a height of an antenna module is maintained below a certain level.

According to this specification, by arranging a 4G/5G antenna and a Wi-Fi antenna for multiple input/multiple output (MIMO) on front and rear surfaces of a PCB, respectively, an antenna module capable of operating in a broad band may be mounted on a vehicle to support various communication systems.

Further scope of applicability of the disclosure will become apparent from the foregoing detailed description. It should be understood, however, that the detailed description and specific examples, such as the preferred embodiment of the disclosure, are given by way of illustration only, since various modifications and alternations within the spirit and scope of the disclosure will be apparent to those skilled in the art.

In relation to the foregoing description, the antenna system mounted in the vehicle and the operation of controlling the same may be implemented by software, firmware, or a combination thereof. Meanwhile, the design of the antenna system mounted in the vehicle and the configuration of controlling the antenna system may be implemented as computer-readable codes in a program-recorded medium. The computer-readable medium may include all types of recording devices each storing data readable by a computer system. Examples of such computer-readable media may include hard disk drive (HDD), solid status disk (SSD), silicon disk drive (SDD), ROM, RAM, CD-ROM, magnetic tape, floppy disk, optical data storage element and the like.

Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. The scope of the disclosure should be determined by reasonable interpretation of the appended claims and all changes that come within the equivalent scope of the disclosure are included in the scope of the disclosure.

What is claimed is:

1. An antenna module comprising:
- a first cover;
- a second cover configured to be capable of being combined with the first cover; and
- a printed circuit board (PCB) having multiple layers arranged inside the first cover and the second cover,
- wherein the PCB having the multiple layers comprises:
- a first layer having patterns connected to a control element; and
- a second layer comprising a conductive pattern that operates as ground and a feeding pattern, the second layer having a slot which is arranged in an edge portion thereof and from which the conductive pattern is removed,
- wherein a first pattern constituting a first outer peripheral area and a second pattern constituting a second outer peripheral area each comprised in the slot are divided by a slit,
- a pattern that operates as ground, among the patterns of the first layer, is connected to the conductive pattern of the second layer through a via, and the feeding pattern is connected to the first pattern through a connection pattern,
- an inner surface of the second cover has a conductive pattern placed thereon, and the conductive pattern of the second cover is electrically connected to the first pattern, and
- the second cover has a non-conductive portion, and the non-conductive portion is configured to overlap the slot of the PCB.

2. The antenna module of claim 1, further comprising an added conductive pattern connected to a first point in the first outer peripheral area inwardly adjacent to a point connected to the connection pattern through a dielectric contact portion, and arranged to be bent toward inside of the first outer peripheral area.

3. The antenna module of claim 2, wherein the first pattern of the first outer peripheral area comprises a first sub-pattern connected to the connection pattern and, a second sub-pattern connected to the first sub-pattern and constituting an end portion of the PCB, and
- the slot comprises a first slot area arranged between the first sub-pattern and the second outer peripheral area, and a second slot area arranged between the second sub-pattern and the second outer peripheral area.

4. The antenna module of claim 3, wherein a second length of the second sub-pattern is configured to be greater than a first length of the first sub-pattern,
- a second slot length of the second slot area is configured to be smaller than a first slot length of the first slot area, and
- the added conductive pattern is arranged within an area defined by the first slot area and radiates a signal through the non-conductive portion of the second cover.

5. The antenna module of claim 4, wherein the added conductive pattern comprises:
- a first sub-conductive pattern connected to the first pattern of the first outer peripheral area and arranged to extend in a first axial direction; and
- a second sub-conductive pattern arranged to extend from an end portion of the first sub-conductive pattern in a second axial direction perpendicular to the first axial direction, and
- the second sub-conductive pattern extends from the second slot area toward the second sub-pattern so that an end portion of the second sub-conductive pattern is arranged to be apart from an end portion of the second sub-pattern by a predetermined space.

6. The antenna module of claim 3, wherein the PCB further comprises at least one third layer arranged between the first layer and the second layer.

7. The antenna module of claim 6, wherein the slot further comprises a third slot area arranged to be adjacent to an inner end portion of the first pattern of the first outer peripheral area, and having the feeding pattern arranged therein,
- the third slot area comprises at least one conductive pad adjacent to the feeding pattern,
- the slit comprises a first slit area which is arranged on the third layer and from which a dielectric area is removed, and
- the first slit area is arranged between the first sub-pattern and the at least one conductive pad.

8. The antenna module of claim 7, wherein the slot further comprises a fourth slot area arranged to be adjacent to an inner end portion of the second pattern of the second outer peripheral area,
- the fourth slot area comprises at least one second conductive pad arranged between the second pattern and the third pattern each comprised in the second outer peripheral area, the third pattern being configured to connect the first pattern and the second pattern,
- the slit further comprises a second slit area which is arranged in the third layer and from which a dielectric area is removed, and
- the second slit area is arranged between the second pattern and the at least one second conductive pad.

9. The antenna module of claim 2, wherein the added conductive pattern is arranged on one surface of the non-conductive portion of the second cover, and
- the added conductive pattern transmits a signal into a vehicle through the non-conductive portion of the second cover.

10. The antenna module of claim 2, wherein an antenna element that radiates a signal in a plurality of frequency bands through the first pattern of the first outer peripheral area, the second pattern of the second outer peripheral area, and the slot is arranged, and
- the antenna element transmits a signal of the plurality of frequency bands into a vehicle through the non-conductive portion of the second cover.

11. The antenna module of claim 10, wherein a first electric field is coupled from the first outer peripheral area to the second outer peripheral area in a first frequency band, and
- the antenna element operates in a first mode, which is a closed slot mode, in the first frequency band by the coupled first electric field.

12. The antenna module of claim 11, wherein a second electric field is generated through the first outer peripheral area and the second outer peripheral area each comprised in the slot in a second frequency band, and the antenna element operates in a second mode, which is an open slot mode, in the second frequency band which is higher than the first frequency band by the second electric field.

13. The antenna module of claim 12, wherein a third electric field is generated through an area in which the connection pattern is arranged, the first outer peripheral area, and the second outer peripheral area in a third frequency band, the antenna element operates in a planar inverted-F antenna (PIFA) mode toward an end portion of the added conductive pattern, and the antenna element operates in a third mode in which the open slot mode and the PIFA mode are combined with each other in the third frequency band which is higher than the second frequency band by the third electric field.

14. The antenna module of claim 13, wherein a fourth electric field is generated through an area in which the connection pattern is arranged and the first outer peripheral area in a fourth frequency band, the antenna element operates in a planar inverted-F antenna (PIFA) mode toward the end portion of the added conductive pattern, and the antenna element operates in a fourth mode in which the open slot mode and the PIFA mode are combined with each other in the fourth frequency band which is higher than the third frequency band by the fourth electric field.

15. The antenna module of claim 1, further comprising a plurality of antenna elements arranged on the first layer and configured to radiate a signal in a particular frequency band through a non-conductive portion of the first cover, wherein the plurality of antenna elements radiate signals in the particular frequency band to outside of the vehicle through the non-conductive portion of the first cover to perform multiple input/multiple output (MIMO) with an entity outside the vehicle.

16. A vehicle comprising:

a roof structure configured as an outer appearance of the vehicle and comprising a first fixing part and a second fixing part; and an antenna module arranged on the roof structure, wherein the antenna module comprises:

a first cover;

a second cover configured to be capable of being combined with the first cover; and a printed circuit board (PCB) having multiple layers arranged inside the first cover and the second cover, wherein the PCB having the multiple layers comprises:

a first layer having patterns connectible to a control element or a radiator; and a second layer comprising a conductive pattern that operates as ground and a feeding pattern, the second layer having a slot which is arranged in an edge portion thereof and from which the conductive pattern is removed, wherein a first pattern constituting the first outer peripheral area and a second pattern constituting the second outer peripheral area each comprised in the slot are divided by a slot area which is a dielectric area from which a conductive pattern is removed, a pattern that operates as ground, among the patterns of the first layer, is connected to the conductive pattern of the second layer through a via, and the feeding pattern is connected to the first pattern through a connection pattern, an inner surface of the second cover has a conductive pattern placed thereon, and the conductive pattern of the second cover is electrically connected to the first pattern, the second cover has a non-conductive portion, and the non-conductive portion is configured to overlap the slot of the PCB to radiate signals in a plurality of frequency bands.

17. The vehicle of claim 16, wherein the antenna module further comprises an added conductive pattern connected to a first point in the first outer peripheral area inwardly adjacent to a point connected to the connection pattern through a dielectric contact portion, and arranged to be bent toward inside of the first outer peripheral area.

18. The vehicle of claim 17, wherein the first pattern of the first outer peripheral area comprises a first sub-pattern connected to the connection pattern, and a second sub-pattern connected to the first sub-pattern and constituting an end portion of the PCB, and the slot area comprises:

a first slot area arranged between the first sub-pattern and the second outer peripheral area;

a second slot area arranged between the second sub-pattern and the second outer peripheral area; and a third slot area in which a feeding pad is arranged, wherein a second length of the second sub-pattern is configured to be greater than a first length of the first sub-pattern, a second slot length of the second slot area is configured to be smaller than a first slot length of the first slot area, and the added conductive pattern is arranged within an area defined by the first slot area, and the added conductive pattern radiates signals in the plurality of frequency bands through the non-conductive portion of the second cover.

19. The vehicle of claim 16, wherein an antenna element that radiates a signal in a plurality of frequency bands through the first pattern of the first outer peripheral area, the second pattern of the second outer peripheral area, and the slot is arranged, and the antenna element transmits a signal of the plurality of frequency bands into the vehicle through the non-conductive portion of the second cover, wherein a first electric field is coupled from the first outer peripheral area to the second outer peripheral area in a first frequency band, and a second electric field is generated through the first outer peripheral area and the second outer peripheral area each comprised in the slot in a second frequency band which is higher than the first frequency band, wherein the antenna element is configured to:

operate in a first mode, which is a closed slot mode, in the first frequency band by the coupled first electric field, and operate in a second mode, which is an open slot mode in the second frequency band by the second electric field.

20. The vehicle of claim 19, wherein a third electric field is generated through an area in which the connection pattern is arranged, the first outer peripheral area, and the second outer peripheral area in a third frequency band, a fourth electric field is generated through an area in which the connection pattern is arranged and the first outer peripheral area in a fourth frequency band which is higher than the third frequency band, and the connection pattern is connected to the first pattern and operates in a planar inverted-F Antenna (PIFA) mode in the area in which the connection pattern is arranged, wherein the antenna element is configured to:

operate in a third mode in which the open slot mode and the PIFA mode are combined with each other in the third frequency band which is higher than the second frequency band by the third electric field, and operate in a fourth mode in which the open slot mode and the PIFA mode are combined with each other in the fourth frequency band by the fourth electric field.

* * * * *